United States Patent [19]

Ohta

[11] Patent Number: 5,726,963

[45] Date of Patent: Mar. 10, 1998

[54] INFORMATION REPRODUCTION APPARATUS INCLUDING A PHASE COMPENSATION CIRCUIT FOR ELIMINATING THE INFLUENCE OF AC-COUPLING

[75] Inventor: Shinichi Ohta, Tokyo, Japan

[73] Assignee: Canon Kabushiki Kaisha, Tokyo, Japan

[21] Appl. No.: 633,176

[22] Filed: Apr. 16, 1996

[30] Foreign Application Priority Data

Apr. 17, 1995 [JP] Japan ................. 7-090930

[51] Int. Cl.$^6$ .................................... G11B 7/00
[52] U.S. Cl. ............................ 369/124; 369/15
[58] Field of Search ............... 369/124, 15, 109, 369/44.37, 44.32, 44.34, 44.76, 44.35, 59, 32

[56] References Cited

U.S. PATENT DOCUMENTS

| | | | |
|---|---|---|---|
| 4,736,354 | 4/1988 | Yoshio | 369/44.34 |
| 5,189,659 | 2/1993 | Ohta | 369/109 |
| 5,381,398 | 1/1995 | Kaneko et al. | 369/124 |
| 5,499,226 | 3/1996 | Ohta et al. | 369/59 |

*Primary Examiner*—Tan Dinh
*Attorney, Agent, or Firm*—Fitzpatrick, Cella, Harper & Scinto

[57] ABSTRACT

An information reproduction apparatus is provided with a reproduction signal processing system for reproducing digital information recorded on an information track of a recording medium by a pit edge recording method and for reproducing the digital information by converting a reproduction signal read out from the recording medium into a binary signal after the reproduction signal is subjected to AC-coupling. The information reproduction apparatus is further provided with a phase compensation circuit arranged in the reproduction signal processing system to compensate for a phase distortion of the reproduction signal under the influence of the AC coupling.

11 Claims, 18 Drawing Sheets

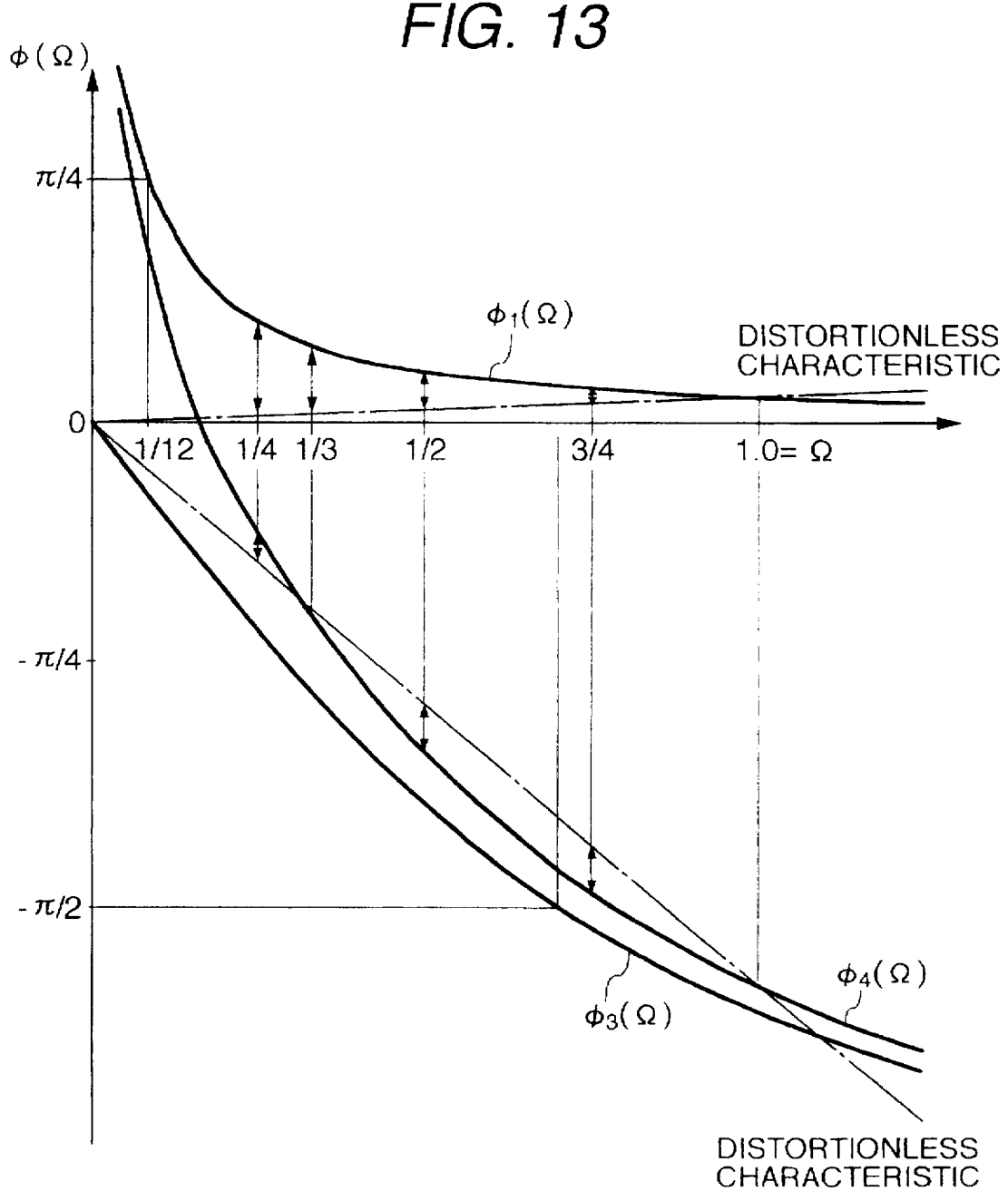

INFORMATION REPRODUCTION APPARATUS INCLUDING A PHASE COMPENSATION CIRCUIT FOR ELIMINATING THE INFLUENCE OF AC-COUPLING

BACKGROUND OF THE INVENTION

1. Field of the Invention

The present invention relates to an information reproduction apparatus for reproducing information recorded on an information recording medium and, more particularly, to an information reproduction apparatus with a reproduction signal processing system including an AC coupling circuit.

2. Related Background Art

As conventional information recording methods for recording information in the format of digital signals, a magnetic recording method, an optical recording method, a magneto-optical recording method, and the like are known. In the following description, optical recording will be exemplified. As recording media on and from which information is optically recorded and read out, various types of media such as a disk-shaped medium, a card-shaped medium, a tape-shaped medium, and the like are known. In particular, the application purposes of a card-shaped recording medium (to be referred to as an optical card hereinafter) are expected to diversify due to its features such as easy manufacture, good portability, and high accessibility.

FIG. 1 is a plan view showing the recording surface of a conventional optical card. On the information recording surface of an optical card C shown in FIG. 1, a plurality of parallel information tracks $T_{a1}, T_{a2}, T_{a3}, \ldots$ are arranged in the direction of arrows L and F. Tracking tracks are arranged between adjacent ones of the information tracks. When information is recorded, a light spot is scanned on an information track using a tracking track as a guide track, thus recording digital information on the information track as an information bit sequence.

A track number indicating the position of each information track $T_a$ is assigned to regions TN1 and TN2 at the two ends of the information track $T_a$ on the optical card C. In this case, either one of the regions TN1 and TN2 may be formed. However, in order to detect the track number of a track first upon scanning of a light beam spot independently of the scanning direction, the regions TN1 and TN2 are preferably added to the two ends of an information recording region. Therefore, the regions TN1 and TN2 record an identical number.

When information is recorded on the information track $T_a$, only one information file may be recorded on a single track, as indicated by S1 in FIG. 1. When an information file to be recorded has a small information amount, it is more efficient to record information while dividing one track into a plurality of sectors. S2 and S3 in FIG. 1 indicate an example wherein recording is performed while dividing a single information track $T_a$ into two sectors. When the information track is divided, the number of sectors is not particularly limited. However, it is a general practice to set the minimum recorded information amount of each sector to be about 32 bytes or 16 bytes. Tracks above S1 and S2 in FIG. 1 correspond to a non-recorded region.

Furthermore, when an information file is recorded, a directory file indicating management information of the information file is normally recorded at the same time. In such a file management method based on directories, a region where a directory file is to be recorded is determined in advance by a software program. Upon reproduction of an information file, a directory file is reproduced to read its contents, and the recording position of a target information file is found based on the management file. Then, the target information file is reproduced.

Various optical information recording/reproduction apparatuses for such an optical card have been proposed. In such apparatus, recording and reproduction are performed while always executing auto-tracking control and auto-focusing control. Information is recorded on a recording medium by scanning an information track with a light beam which is modulated in accordance with the information to be recorded and is focused to a very small light spot. As a result, the information is recorded as an optically detectable information bit sequence. Information is reproduced from the recording medium by scanning the information bit sequence on the information track with a light beam spot which has a predetermined low power that does not allow recording on the recording medium, and detecting light reflected by or transmitted through the medium.

FIG. 2 shows the typical arrangement of an optical system of such an information recording/reproduction apparatus. Referring to FIG. 2, a light beam emitted by a semiconductor laser 101 is collimated by a collimator lens 102, and the collimated beam is split into a plurality of light beams by a diffraction grating 103. Thereafter, the split beams are focused on the optical card C via a polarization beam splitter 104, a quarter-wave plate 105, and an objective lens 106. Light reflected by the optical card C is incident on a photodetector 109 via the objective lens 106, the quarter-wave plate 105, the polarization beam splitter 104, and a toric lens 108. At this time, of the light beams split by the diffraction grating 103, the 0th-order diffracted light beam is used for performing recording, reproduction, and auto-focusing control (to be abbreviated as AF hereinafter), and the ±1st-order diffracted light beams are used for performing auto-tracking control (to be abbreviated as AT hereinafter). The AF adopts a non-astigmatism method, and the AT adopts a 3-beam method.

FIG. 3 is an enlarged view of an information track and tracking tracks on the optical card C. Tracking tracks tt1 and tt2 are defined by grooves or consist of a material having a reflectance different from that of a track $T_a$. By forming the grooves or setting a different reflectance, the information track is distinguished from the tracking tracks. The tracking tracks are used as guides for obtaining tracking control signals. The information track $T_a$ is irradiated with a 0th-order diffracted light beam 110 for recording, reproduction, and AF, and the tracking tracks tt1 and tt2 are irradiated with ±1st-order diffracted light beams 111 and 112 for AT. The tracking control signals are generated based on reflected light of these diffracted light beams 111 and 112, and the tracking control is performed based on these signals to normally scan the 0th-order light beam 110 on the track $T_a$.

With this tracking control, the diffracted light beams 110, 111, and 112 scan on the optical card by a driving mechanism (not shown) in the up-and-down direction in the plane of the page of FIG. 3 while maintaining the same positional relationship, thereby recording information on the information track $T_a$. Each of hatched portions 113a, 113b, and 113c in FIG. 3 corresponds to digital information recorded by scanning the 0th-order diffracted light beam 110, and is generally called an information bit. The information bits 113a, 113b, and 113c have a reflectance different from that of their surrounding portion. For this reason, when these bits are scanned with a weak beam spot 110 again, reflected light of the 0th-order diffracted light beam 110 is modulated by the bits 113a, 113b, and 113c, thus obtaining a reproduction signal corresponding to the information bits.

FIG. 4 is a diagram showing the arrangement of the photodetector 109 shown in FIG. 2, and the arrangement of a signal processing circuit for generating a reproduction signal, a tracking control signal, and a focusing control signal by processing the output signal from the photodetector 109. The photodetector 109 is constituted by a total of six photosensor portions, i.e., a 4-split photosensor 114, and photosensors 115 and 116. Light spots 110a, 111a, and 112a respectively correspond to reflected light beams of the diffracted light beams 110, 111, and 112 shown in FIG. 3. The light spot 110a is focused on the 4-split photosensor 114, and the light spots 111a and 112a are respectively focused on the photosensors 115 and 116. The sensor outputs in the diagonal directions of the 4-split photosensor 114 are respectively added by adders 117 and 118.

The outputs from the adders 117 and 118 are added by an adder 121, and the sum signal is output as an information reproduction signal RF. That is, the signal RF corresponds to a sum total signal of the outputs from the respective detection segments of the 4-split photosensor 114. On the other hand, the output from the adder 118 is subtracted from the output from the adder 117 by a differential circuit 120, and the difference signal is output as a focusing control signal Af. That is, the signal Af corresponds to a difference signal between the sums, in the diagonal directions, of the 4-split photosensor 114. Since the non-astigmatism method is described in detail in various literature, and is not directly related to the present invention, a detailed description thereof will be omitted. The output from the photosensor 116 is subtracted from the output from the photosensor 115 by a differential circuit 119, and the difference signal is output as a tracking control signal At. Normally, tracking control is attained by controlling the signal At to become zero.

FIG. 5 is a diagram showing an example of an information reproduction circuit for processing the information reproduction signal RF as the output from the adder 121 shown in FIG. 4. Referring to FIG. 5, the information reproduction signal RF is normally AC-coupled by a capacitor C101 and a resistor R101 before it is largely amplified by an amplifier. Since the light amount of the light spot 110a upon reproduction of information is very small, the amplifier gain must be increased. On the other hand, since the photosensor 114 suffers from a temperature drift, if the DC signal is amplified, the amplifier is saturated due to the temperature drift. This is the reason for the presence of an AC coupling circuit. The AC-coupled information reproduction signal RF is largely amplified by an operational amplifier (to be referred to as an OP amplifier hereinafter) 122 and resistors R102 and R103.

The amplified information reproduction signal RF may be directly converted into a binary signal, but is normally filtered by a filter circuit 123. The role of the filter circuit is to improve the S/N (signal-to-noise) ratio by limiting the frequency range, and the filter circuit normally comprises a sharp-cut low-pass filter of 2nd order or higher. When the reproduction light spot 110 has a size equal to or larger than the information bit 113, the amplitude of the reproduction signal from the short information bit 113c becomes smaller than those of the long information bits 113a and 113b due to a large low-pass effect of the light spot. In view of this problem, the filter circuit often comprises an equalizer circuit, which can correct any amplitude difference that may be produced depending on the lengths of the information bits, by increasing the amplitude characteristics of the filter circuit 123 near the reproduction frequency of the information bit 113c. In this case, since the phase distortion caused by the equalizer circuit itself is large, the equalizer circuit is often arranged in combination with a phase compensation circuit for correcting the phase distortion.

The information reproduction signal RF output from the filter circuit 123 is AC-coupled again by a capacitor C102 and a resistor R104, and the AC-coupled signal is output to a comparator 124. The signal RF is compared with a predetermined threshold value in the comparator 124 to be converted into binary data. The second AC coupling circuit is arranged for the purpose of correcting offsets. More specifically, since the gain of the OP amplifier 122 is very large, an offset is easily generated, and the filter circuit 123 also suffers from an offset. When a reproduction signal has an offset, this means that the average value of the signal deviates from a threshold value for binary conversion. For this reason, the binary-conversion phase deviates, and the pulse width changes, resulting in jitter. Therefore, in order to correct such offset, an offset correction circuit may be arranged. In this case, however, since the average value of the reproduction signal need only be matched with the threshold value, it can be attained more easily by the AC coupling circuit, as shown in FIG. 5. The comparator 124 normally has hysteresis characteristics so as to prevent an operation error due to noise, but a description thereof will be omitted.

A binary RF signal binary-converted by the comparator 124 is input to a PLL circuit 125 to generate a clock signal CLK synchronous with the binary RF signal. Also, the binary RF signal is sampled by a flip-flop 126 in response to the clock CLK to be converted into a binary signal DATA synchronous with the clock CLK. Since data to be recorded on a recording medium is normally modulated, the signal DATA is demodulated by a demodulation circuit (not shown) and the demodulated signal is recorded on a memory. The clock signal CLK is also used as a synchronization clock for the demodulation circuit and the memory access.

In the above description, the AC coupling circuit has a role of correcting the temperature drift of a circuit portion including the photosensors, and the electrical offset. However, the AC coupling circuit has another important role. This role will be described below. FIGS. 6 and 7 are waveform charts showing the signals of the respective units in the information reproduction circuit shown in FIG. 5. FIG. 6 shows a case wherein the time constant of the above-mentioned AC coupling circuit is large, and FIG. 7 shows a case wherein the time constant is small. In FIGS. 6 and 7, RF' represents the reproduction signal waveform at the input of the comparator 124, D represents the binary signal waveform at the D terminal of the flip-flop 126, CK represents the clock signal input to the CK terminal of the flip-flop 126, and DATA represents the binary signal data output from the flip-flop 126. A bit portion of the signal RF' corresponds to a portion where the light spot 110 scans the information bits 113 in FIG. 3, while a base portion corresponds to a portion where the light spot 110 scans a portion between adjacent bits. That is, the base portion means a portion where no bit is detected.

When the recording medium is stable, the binary RF signal D and the clock signal CK have a time difference (phase difference) $T_{m0}$ therebetween. However, when the recording medium has an uneven reflectance, the base and bit portions change as indicated by the signal RF' shown in FIG. 6, and their average value also changes as indicated by an alternate long and two short dashed curve in FIG. 6. In this case, since the threshold value of the comparator 124 is constant, i.e., 0 level, the pulse width of the binary RF signal D changes and the time difference between the signal D and the clock signal CK decreases to $T_{m1}$. In an example shown in FIG. 6, no error has occurred. However, jitter is generated by various other causes such as variations of the scanning speed, bit length, and the like, and the margin set in consideration of these causes decreases from $T_{m0}$ to $T_{m1}$. As a result, the probability of occurrence of errors increases due to a synergistic effect with other jitter components. In the case of the signals shown in FIG. 6, the time constant of the AC coupling circuit is large, and the reproduction signals RF and RF' roughly agree with each other on a short term basis. However, in such a case, an error is easily generated.

In contrast to this, FIG. 7 shows the signals when the time constant of the AC coupling circuit is small. The AC coupling circuit originally has an effect of making the average value of a signal constant, and its response speed is inversely proportional to the time constant. That is, the response speed is large in FIG. 6, but it is small in FIG. 7. Therefore, although the reproduction signal RF shown in FIG. 7 changes as in the case shown in FIG. 6, since the time constant of the AC coupling circuit is small, a change in average value of the reproduction signal RF' is small. For this reason, the margin for signal changes is $T_{m2}$, and is larger than the margin $T_{m1}$ in FIG. 6, resulting in a small decrease in margin.

The time constant of the AC coupling circuit can be determined depending on the frequency variation of the reproduction signal RF. In the above description, the signal RF varies due to an uneven reflectance on the recording medium. In addition, the reproduction signal RF varies due to other causes. For example, the reproduction signal RF similarly varies due to contamination, dust, scratches, and the like on the medium surface. In particular, fingerprints tend to be left on the medium surface, and cause variations. Normally, the pitches of fingerprints are about 0.5 mm, and when the fingerprints are optically scanned at high speed, the reproduction signal RF varies at a considerably high frequency. In order to prevent a decrease in jitter margin even for such fingerprints, a small time constant must be set for the AC coupling circuit, i.e., a considerably high AC coupling frequency must be set.

However, in a pit edge recording method in which information is recorded while changing the bit length and bit pitch, the AC coupling circuit itself generates jitter. This problem will be explained below. FIG. 8 is a waveform chart showing recording bits of the pit edge recording method and a reproduction signal thereof. Referring to FIG. 8, bits 127, 128, and 129 are recorded on an information track $T_a$, and of these bits, the bits 127 and 128 are the shortest unit bits having a length or scanning time of 1T. The interval between the bits 127 and 128 is also 1T, and the bit pitch therebetween is 2T. On the other hand, the bit 129 is the longest bit having a length four times that of the bit 127 or 128, i.e., 4T. The interval between the bit 128 and 129 is also 4T, and the bit pitch therebetween is 8T. A reproduction signal RF has roughly a sinusoidal waveform at a 1T signal portion, and has roughly a trapezoidal waveform at a 4T signal portion due to the low-pass effect of the light spot 110, as shown in FIG. 8.

FIG. 9 shows the reproduction signal waveform obtained when the AC coupling frequency is changed. In FIG. 9, 1TRF represents the 1T reproduction signal waveform. The signal waveform of the 1T reproduction signal 1TRF does not largely change due to the AC coupling frequency and maintains roughly a sinusoidal waveform, as shown in FIG. 9, except for a case wherein the AC coupling frequency is extremely high. On the other hand, 4TRF(0) to 4TRF(2) represent the 4T reproduction signals. Of these waveforms, the signal waveform 4TRF(0) corresponds to a case wherein no AC coupling circuit is arranged or the AC coupling frequency is very low. In this case, the phase of the signal 4TRF(0) is locked with that of the 1T reproduction signal 1TRF, and no jitter is generated. The signal waveforms 4TRF(1) and 4TRF(2) correspond to a case wherein the AC coupling frequency is increased. As shown in FIG. 9, these waveforms 4TRF(1) and 4TRF(2) respectively have phase differences $T_{m3}$ and $T_{m4}$, i.e., jitter is generated. The phase difference $T_{m4}$ is larger than $T_{m3}$. That is, the phase difference tends to increase as the AC coupling frequency becomes higher, and the reproduction signal waveform approaches a differential waveform, resulting in an increase in jitter components.

As described above, in order to suppress jitter caused by information reproduction signal variations, a high AC coupling frequency can be set. However, in the pit edge recording, jitter caused by the AC coupling circuit itself increases. For this reason, in the conventional apparatus, a sufficiently high AC coupling frequency cannot be set, and the suppression effect of jitter caused by information reproduction signal variations is limited.

SUMMARY OF THE INVENTION

The present invention has been made in consideration of the above situation and has as its object to provide an information reproduction apparatus which can reproduce information with high reliability by decreasing the amount of jitter caused by information reproduction signal variations in such a manner that a phase compensation means for correcting the phase difference in an electrical system up to binary conversion of a reproduction signal is arranged in a reproduction signal processing system including an AC coupling circuit.

It is another object of the present invention to provide an information reproduction apparatus which can maximally assure the reliability of reproduction across a plurality of tracks without increasing the circuit scale, in such a manner that a phase compensation means for correcting a phase distortion in an electrical system up to binary conversion of a reproduction signal is arranged in at least one of a plurality of reproduction signal processing circuits including AC coupling circuits corresponding to a plurality of tracks to be reproduced at the same time.

In order to achieve the above objects, there is provided an information reproduction apparatus which reproduces digital information recorded on an information track of a recording medium by a pit edge method, and comprises a reproduction signal processing system for reproducing the digital information by converting a reproduction signal read out from the recording medium into a binary signal after the reproduction signal is AC-coupled by an AC coupling circuit, wherein a phase compensation circuit is arranged in the reproduction signal processing system to compensate for a phase distortion of the reproduction signal under the influence of the AC coupling circuit.

The above and other objects and features of the present invention will become apparent from the following description of the embodiments taken in conjunction with the accompanying drawings.

BRIEF DESCRIPTION OF THE DRAWINGS

FIG. 13 is a graph showing the phase characteristics obtained when the phase distortion caused by the AC coupling circuit is corrected by the phase compensation circuit;

DETAILED DESCRIPTION OF THE PREFERRED EMBODIMENTS

Figure 5:
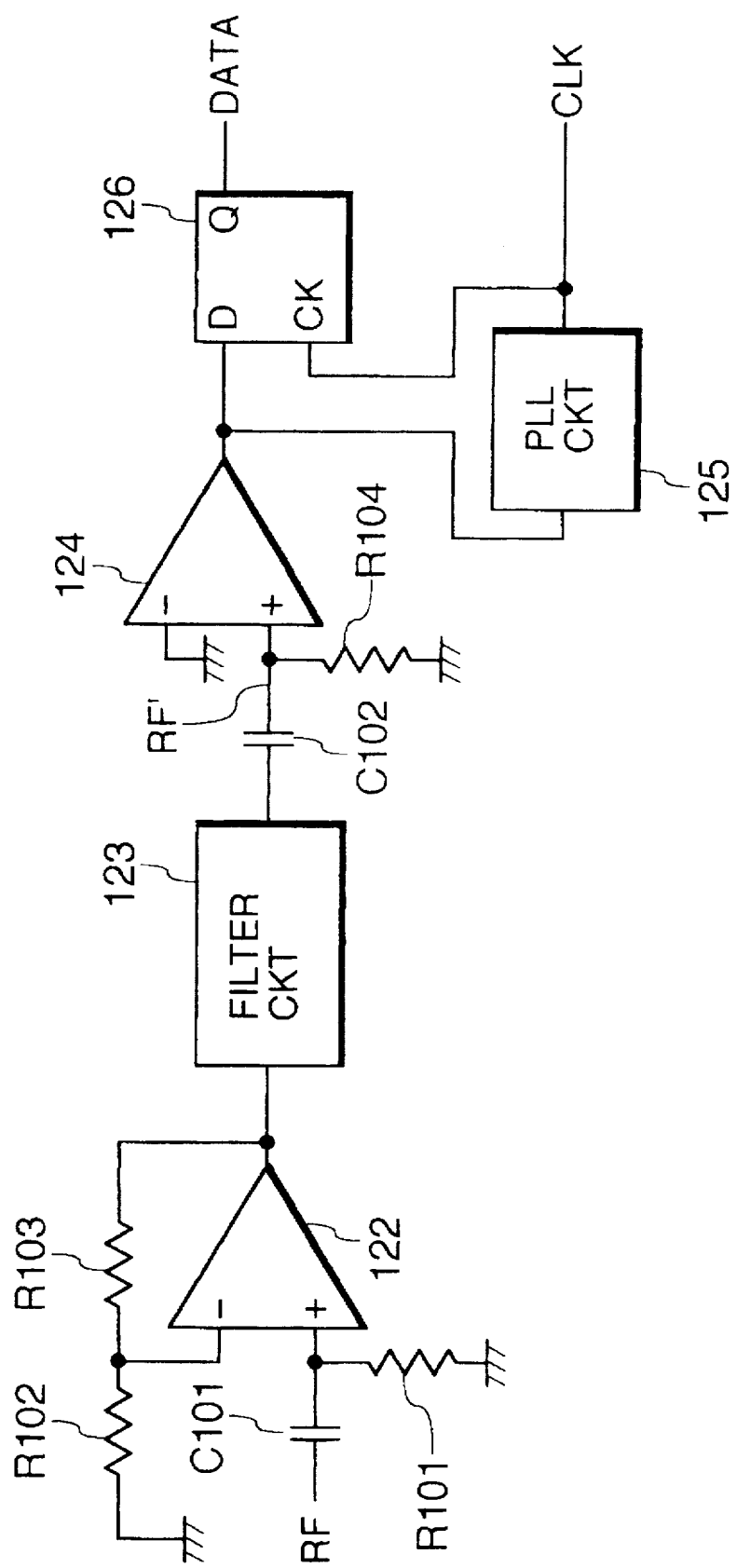
FIG. 5 is a circuit diagram showing a conventional information reproduction apparatus for outputting reproduction data by processing an information reproduction signal.
Figure 6:
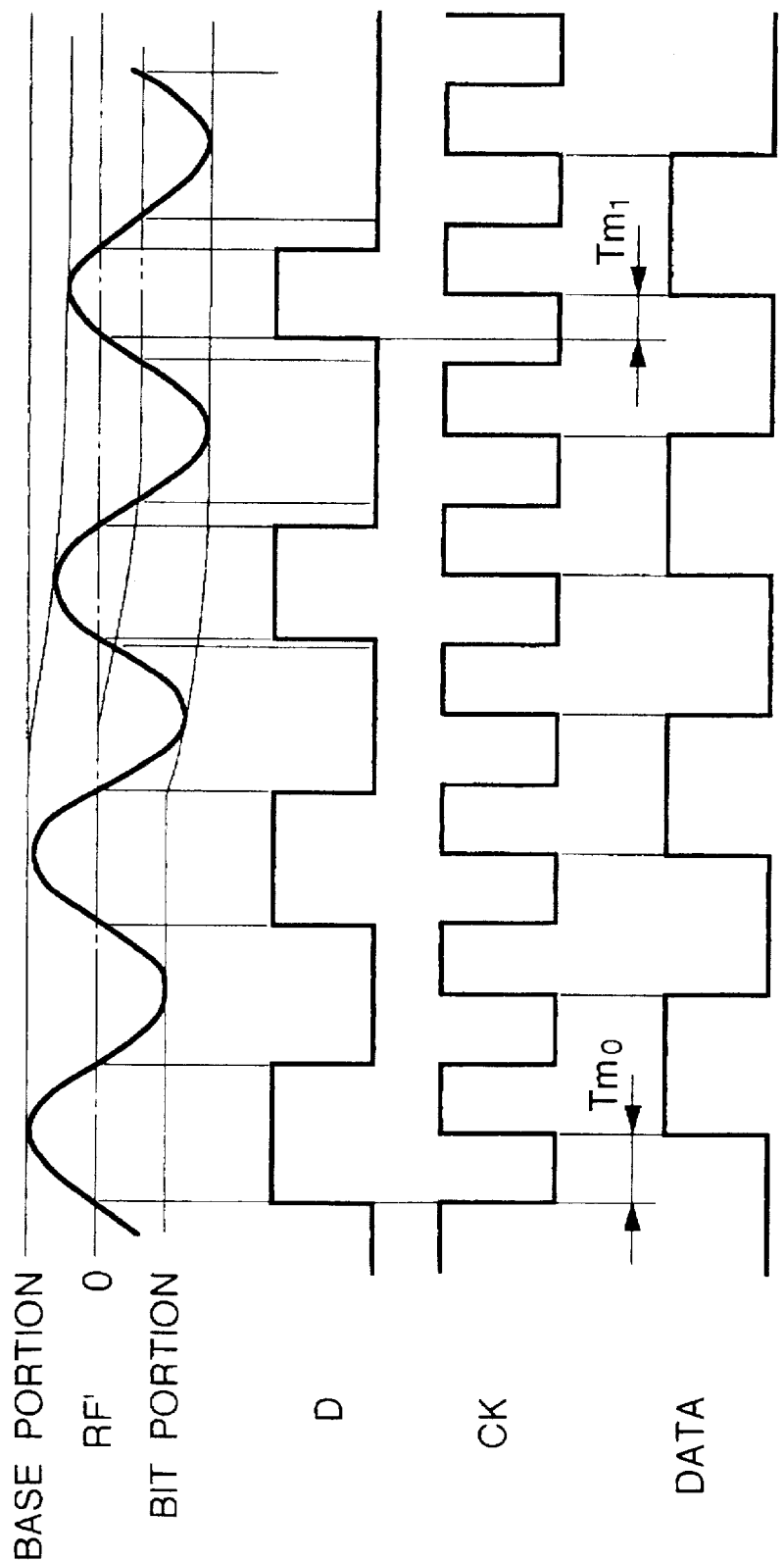
FIG. 6 is a waveform chart showing the signals in the respective units of the information reproduction apparatus shown in FIG. 5 when the time constant of an AC coupling circuit is large.
Figure 7:
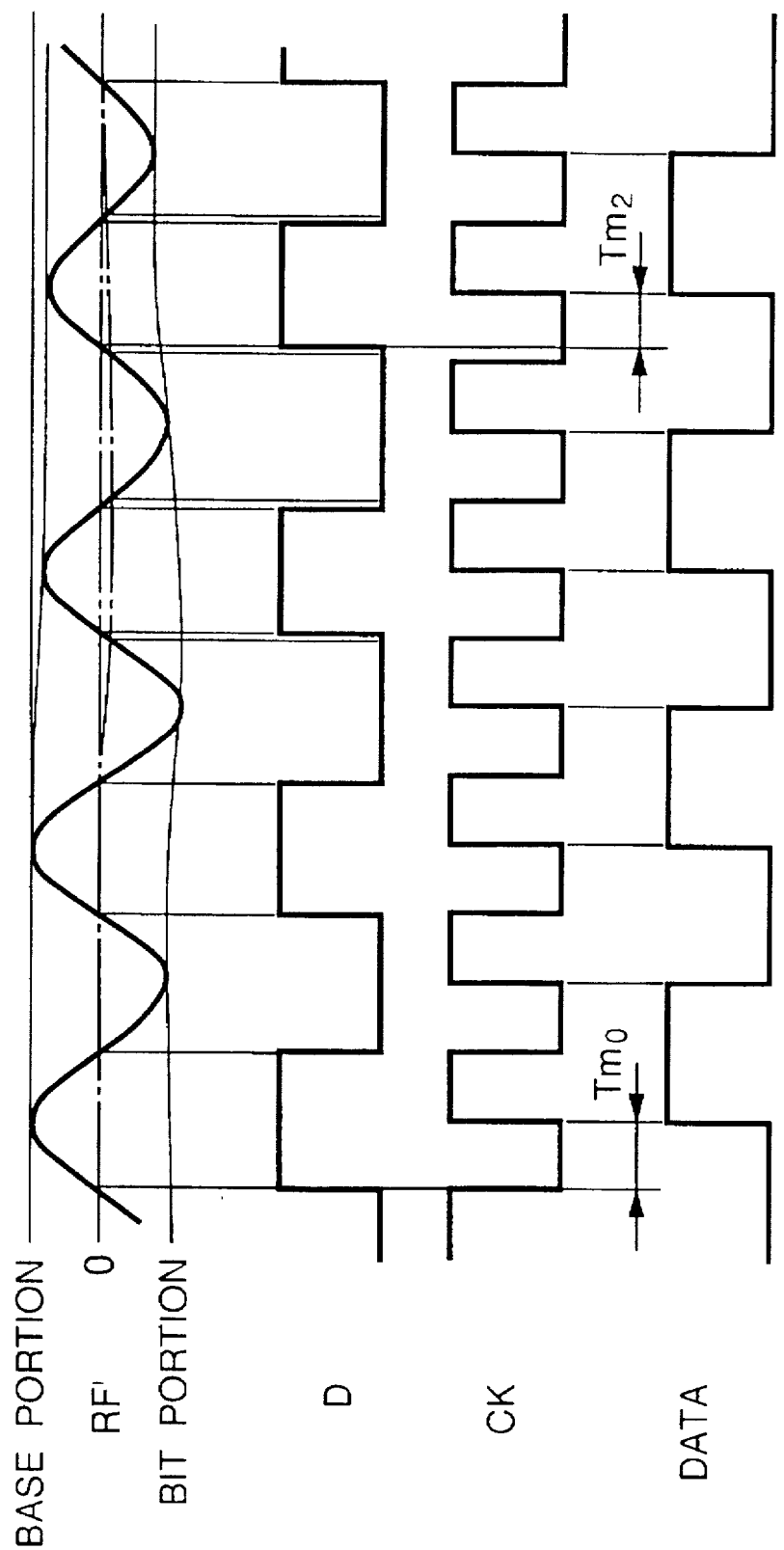
FIG. 7 is a waveform chart showing the signals in the respective units of the information reproduction apparatus shown in FIG. 5 when the time constant of the AC coupling circuit is small.
Figure 10:
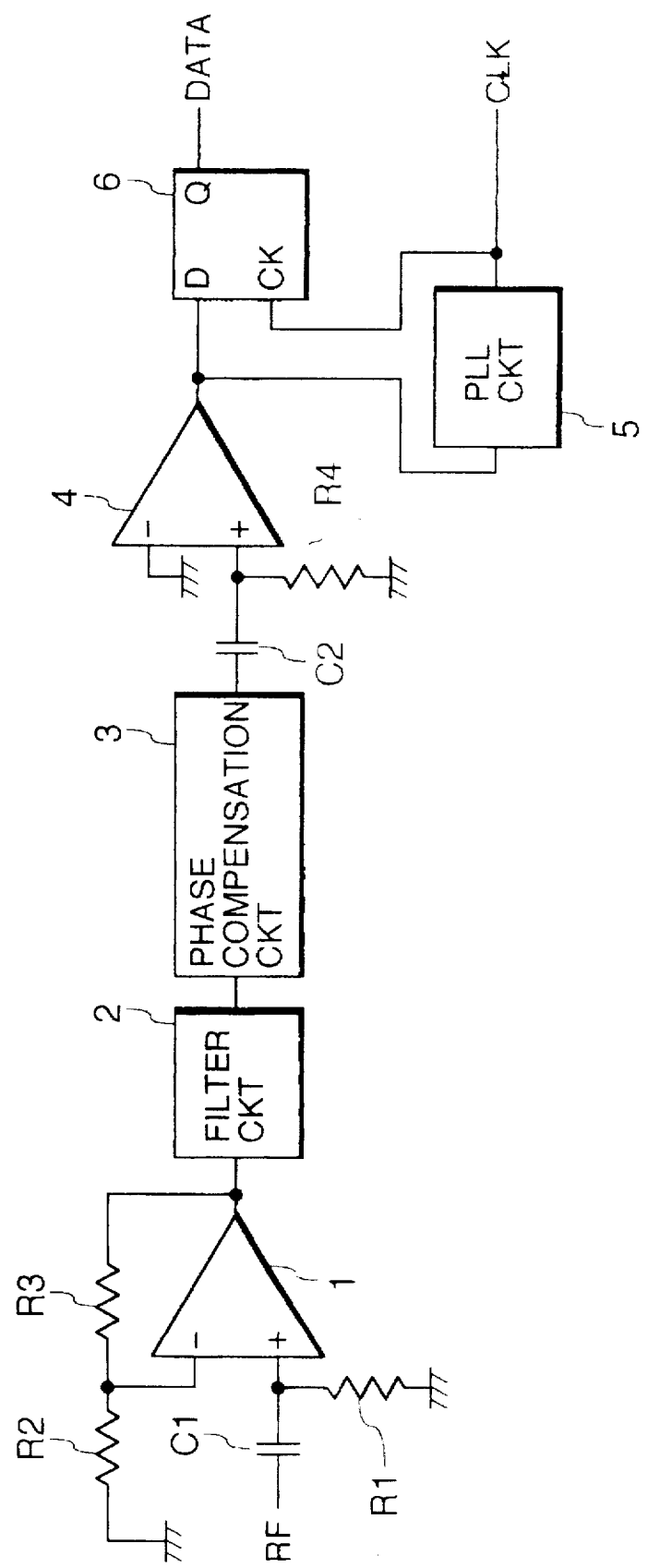
FIG. 10 is a block diagram showing an information reproduction apparatus according to an embodiment of the present invention.

The preferred embodiments of the present invention will be described hereinafter. FIG. 10 is a block diagram showing an information reproduction apparatus according to an embodiment of the present invention. Referring to FIG. 10, capacitors C1 and C2, and resistors R1, R2, R3, and R4 respectively correspond to the capacitors C101 and C102, and the resistors R101, R102, R103, and R104 shown in FIG. 5. Also, an OP amplifier (operational amplifier) 1, a filter circuit 2, a comparator 4, a PLL circuit 5, and a flip-flop 6 respectively correspond to the OP amplifier 122, the filter circuit 123, the comparator 124, the PLL circuit 125, and the flip-flop 126 shown in FIG. 5. In this manner, since constituting elements corresponding to those in FIG. 5 have the same arrangements as those in FIG. 5, a detailed description thereof will be omitted. In this embodiment as well, a reproduction signal RF reproduced from a recording medium such as an optical card is AC-coupled by the capacitor C1 and the resistor R1, and is then input to the OP amplifier 1. Assume that digital information is recorded on the recording medium by a bit edge recording method. The reproduction signal RF is amplified to a predetermined level by the OP amplifier 1, and the amplified signal is filtered by the filter circuit 2. This filtering operation is performed to improve the S/N ratio by limiting the frequency range, as described above. The signal flow described so far is the same as that shown in FIG. 5.

In this embodiment, a phase compensation circuit 3 is arranged between the filter circuit 2 and the capacitor C2 in the next AC coupling circuit. The arrangement and characteristics of the phase compensation circuit 3 will be described in detail later. The phase compensation circuit 3 corrects the phase distortion of an electrical system including the AC coupling circuit, and suppresses generation of jitter. In FIG. 10, the phase compensation circuit 3 is arranged between the filter circuit 2 and the capacitor C2, but the positions of the filter circuit 2 and the phase compensation circuit 3 may replace each other to obtain the same characteristics. In this case, since the filter circuit 2 and the phase compensation circuit 3 may often generate an electrical offset, the phase compensation circuit 3 is preferably arranged before the second AC coupling circuit, as shown in FIG. 10. The reproduction signal whose phase distortion is corrected by the phase compensation circuit 3 is AC-coupled again by the capacitor C2 and the resistor R4, and is then input to the comparator 4. In the comparator 4, the reproduction signal is compared with a threshold value (0 level in this case) to be converted into a binary signal. The binary signal is input to the PLL circuit 5 as in FIG. 5 to generate a clock signal CLK synchronous with the reproduction signal RF. Also, the binary signal output from the comparator 4 is sampled by the clock signal CLK output from the PLL circuit 5 in the flip-flop 6, thereby generating a binary signal DATA synchronous with the clock signal CLK.

Figure 9:
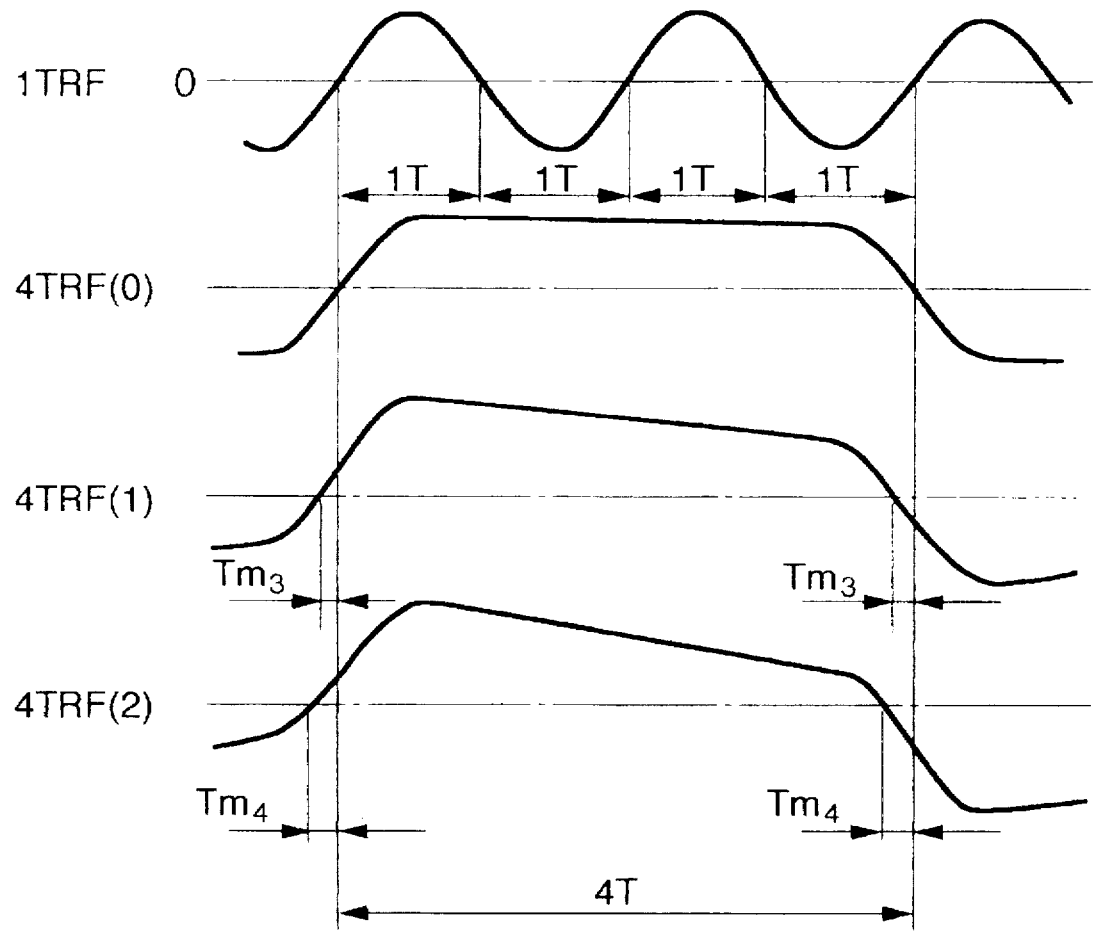
FIG. 9 is a waveform chart showing the 1T and 4T reproduction signal waveforms while changing the AC coupling frequency.

A cause of jitter generated by the AC coupling circuit itself described above will be explained below, and then, a concrete jitter reduction operation of the phase compensation circuit 3 of this embodiment will be described. Referring to FIG. 9, 4TRF(0) represents the 4T reproduction signal waveform obtained when no AC coupling circuit is arranged or when the AC coupling frequency is very low, and 4TRF(1) and 4TRF(2) represent the 4T reproduction signal waveforms obtained when the AC coupling frequency is increased. That is, the signal 4TRF(0) corresponds to an input signal to the AC coupling circuit, and the signal 4TRF(1) or 4TRF(2) corresponds to an output signal from the AC coupling circuit. As can be seen from a comparison between these signals, the AC coupling circuit itself distorts the reproduction signal. Therefore, if the AC coupling circuit has distortionless characteristics, the output signal can become similar to the input signal.

Figure 8:
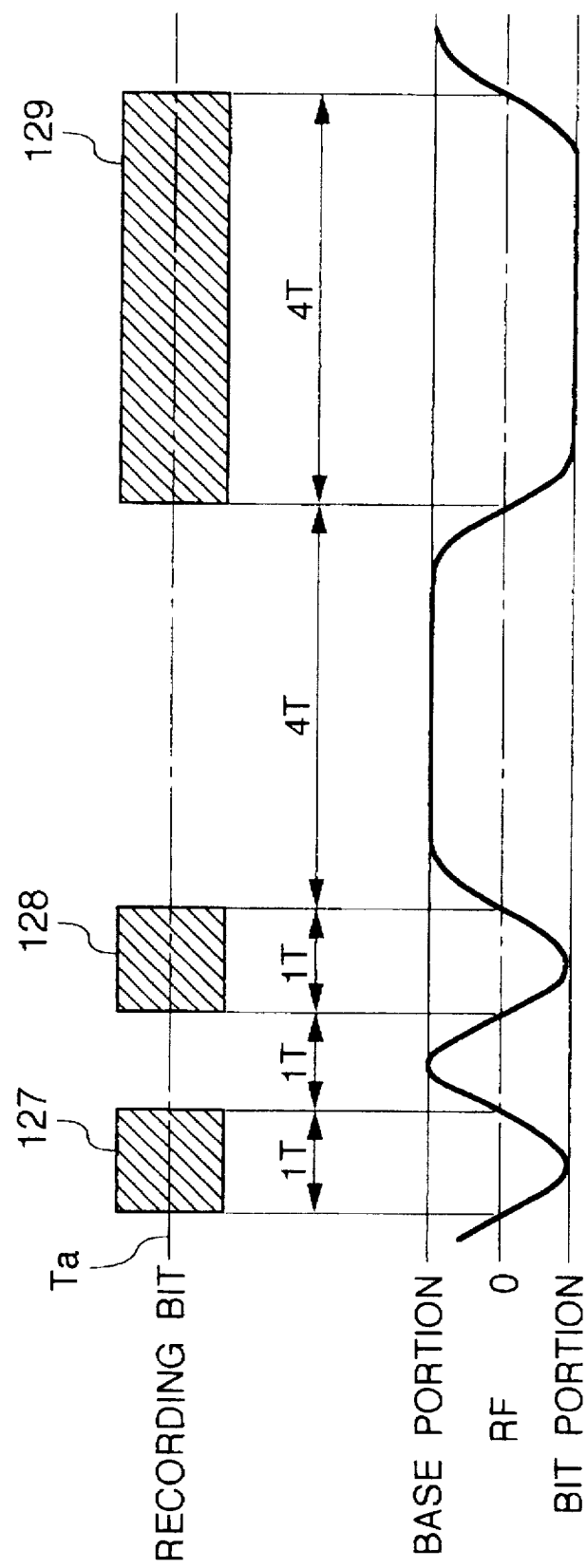
FIG. 8 is a waveform chart showing the recording bits of a pit edge recording method and a reproduction signal thereof.
Figure 11:
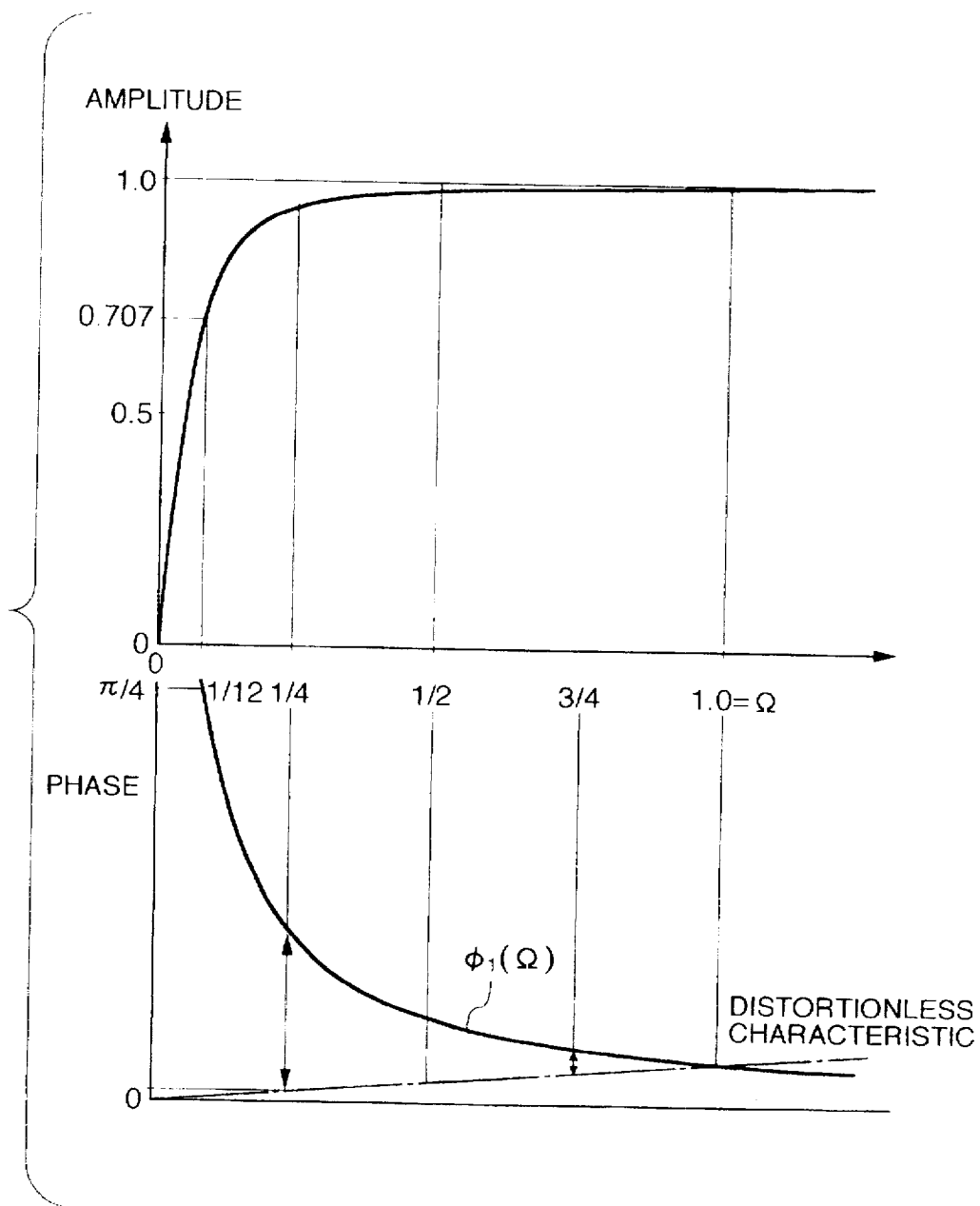
FIG. 11 is a graph showing the amplitude and phase characteristics of an AC coupling circuit.

FIG. 11 is a graph showing an example of the amplitude and phase characteristics of the AC coupling circuit. Referring to FIG. 11, $\Omega$ along the abscissa is the frequency normalized by a frequency $f_{1T}$ corresponding to a fraction of the shortest bit pitch 2T shown in FIG. 8. That is, $\Omega$ is given by:

$$\Omega = f/f_{1T} = f/(½T) = 2Tf$$

where f is the frequency. For example, since the frequency obtained when 4T bit intervals successively appear is given by f=⅛T, $\Omega$ in this case is given by:

$$\Omega = 2T/8T = ¼$$

The characteristics shown in FIG. 11 exemplify a case wherein an AC coupling frequency $f_n = f_{1T}/12$. As has been described above with reference to FIG. 9, since the phase difference is generated by the AC coupling circuit itself, the phase characteristics of the AC coupling circuit pose a problem. This problem will be explained below. The phase characteristics, $\phi_1(\Omega)$, of the AC coupling circuit is given by:

$$\phi_1(\Omega) = \tan^{-1}\{1/(f_{1T}/f_n \Omega)\} = \tan^{-1}(f_n/f)$$

Therefore, as can be seen from the phase characteristics shown in FIG. 11, $\phi_1(\Omega) = \pi/2$ when f=0, and $\phi_1(\infty)$ when f=∞. That is, the phase advance becomes larger as the frequency becomes lower, and becomes smaller as the frequency becomes higher.

On the other hand, as is well known, the distortionless phase characteristics are linear phase characteristics. That is, assuming that the phase is proportional to the frequency, if the coefficient of proportionality is represented by k, the distortionless phase characteristics, $\phi(f)$, are given by:

$$\phi(f) = \pm kf$$

On the other hand, the phase delay time, Td, is constant independently of the frequency, and is expressed as follows by multiplying one period 1/f with the phase ratio:

$$T_d = (1/f) \times \phi(f)/2\pi$$
$$= \pm k/2\pi$$

That is, the delay times of the frequency components become constant to achieve distortionless characteristics.

Therefore, if the phase characteristics shown in FIG. 11 are defined by a straight line passing the origin and a phase at $\Omega = 1.0$, distortionless characteristics are obtained. However, the phase advance must become smaller as the frequency becomes lower, but the phase characteristics of the AC coupling circuit shown in FIG. 11 show an opposite behavior. For example, the reproduction signal of a repetitive pattern of bits having a 4T bit length and a 4T interval consists of frequency components corresponding to $\Omega$=odd multiples of ¼. However, as is apparent from FIG. 11, phase deviations from the distortionless characteristics occur at the positions of $\Omega$=¼ and ¾, as indicated by arrows. This is the cause of jitter shown in FIG. 9. On the other hand, as for the amplitude characteristics shown in FIG. 11, the amplitude lowers at $\Omega$=¼ or less. However, a repetitive pattern of bits having a 4T bit length has no components of $\Omega$=¼ or less. Therefore, the AC coupling circuit does not largely influence the amplitude characteristics.

Therefore, in this embodiment, in consideration of the above-mentioned generation cause of jitter, the phase compensation circuit 3 is arranged to correct the phase characteristics shown in FIG. 11. Ideal characteristics for correcting the phase characteristics shown in FIG. 11 are those symmetrical to the characteristics shown in FIG. 11 about the frequency axis, i.e., characteristics having a phase advance and delay opposite to those of the characteristics shown in FIG. 11. That is, the ideal characteristics are those whose phase delay is $\pi/2$ at zero frequency, and becomes zero at higher frequencies. However, it is difficult to attain such characteristics in practice. Therefore, even when the phase compensation circuit 3 is added to the AC coupling circuit, it is difficult to attain perfect distortionless characteristics. However, it is possible to attain linear phase characteristics across a specific frequency range, and with these characteristics, jitter can be sufficiently reduced.

Figure 12A:
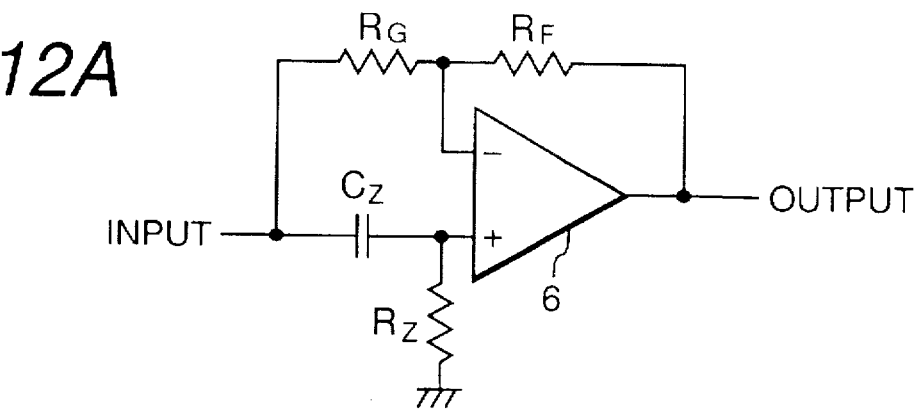
FIGS. 12A to 12C are circuit diagrams showing examples of a phase compensation circuit 3 of the embodiment shown in FIG. 10.
Figure 12B:
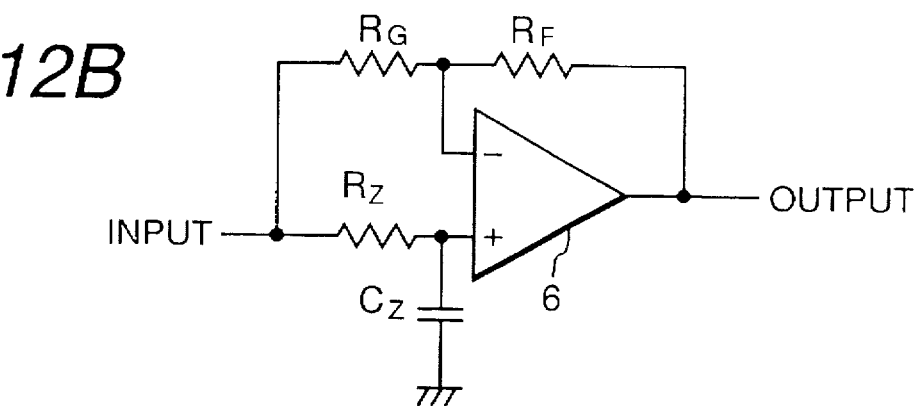
Figure 12C:
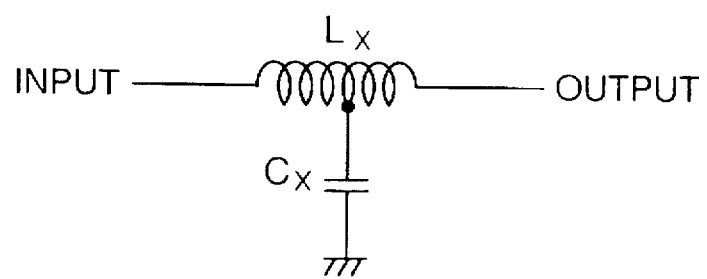

FIGS. 12A to 12C show examples of the phase compensation circuit 3. FIGS. 12A to 12C show three examples, and these circuits are linear phase circuits in which the frequency characteristics of amplitude are 1, i.e., are not modulated at all, and only the phase is delayed. FIGS. 12A and 12B show examples using active filters, and FIG. 12C shows an example using a filter constituted by an inductance $L_x$ and a capacitor $C_x$. Referring to FIGS. 12A and 12B, the active filter comprises a capacitor $C_z$, a resistor $R_x$, an OP amplifier 6, and resistors $R_G$ and $R_F$. The examples shown in FIGS. 12A to 12C are linear phase circuits, but a quadratic phase circuit may be used. However, with the quadratic phase circuit, since the number of elements increases, the circuit arrangement is complicated accordingly. As will be described in detail later, even the linear phase circuit can sufficiently correct phase distortion. As has already been described above with reference to FIG. 5, in the conventional apparatus as well, the phase circuit is added to the filter circuit 2, as shown in FIG. 12. However, this phase circuit is added for the purpose of correcting the phase characteristics of the filter circuit 2 itself but does not correct the phase characteristics of the AC coupling circuit.

FIG. 13 is a graph showing the phase characteristics obtained when the phase distortion caused by the AC coupling circuit is corrected by one of the phase compensation circuits shown in FIGS. 12A to 12C. Referring to FIG. 13, $\phi_1(\Omega)$ represents the phase characteristics of the AC coupling circuit, which are the same as the characteristics $\phi_1(\Omega)$ shown in FIG. 11. $\phi_3(\Omega)$ represents the phase characteristics obtained when the constant of one of the phase circuits shown in FIGS. 12A to 12C is appropriately selected. The phase at this time is 0 at zero frequency and is delayed by $\pi$ at ∞ frequency. That is, the phase characteristics at this time define a downward convex curve with respect to the straight line, i.e., have a large phase delay at lower frequencies with respect to the characteristics defined by the straight line. Therefore, when the phase characteristics $\phi_1(\Omega)$ and $\phi_3(\Omega)$ are synthesized, the synthesized phase characteristics, $\phi_4(\Omega)$, are given by:

$$\phi_4(\Omega) = \phi_1(\Omega) + \phi_3(\Omega)$$

Therefore, with respect to the distortionless characteristics defined by the straight line connecting the origin and $\Omega = 1.0$, the phase difference at $\Omega$=¼ obtained by the synthesized phase characteristics $\Phi_4(\Omega)$ can be smaller than that obtained by $\phi_1(\Omega)$.

In FIG. 13, the phase difference at $\Omega$=¾ obtained by the synthesized phase characteristics $\phi_4(\Omega)$ becomes larger than that obtained by only $\phi_1(\Omega)$. However, in terms of the delay time, since the phase difference at higher frequencies does not assume a large value and the frequency component of a signal is small due to the high frequencies, the phase difference is corrected sufficiently. FIG. 13 corresponds to a case wherein no filter circuit 2 is arranged or the frequency characteristics of the filter circuit 2 are such that $\Omega=1.0$ or less within a high-frequency range, and phase delays can be ignored. Note that FIG. 10 corresponds to the quadratic characteristics since two AC coupling circuits are arranged, but FIG. 13 shows the linear characteristics of one AC coupling circuit. This is because linear approximation can be attained when the ratio between the frequencies of the two circuits is set to be large, as will be described later.

Figure 14:
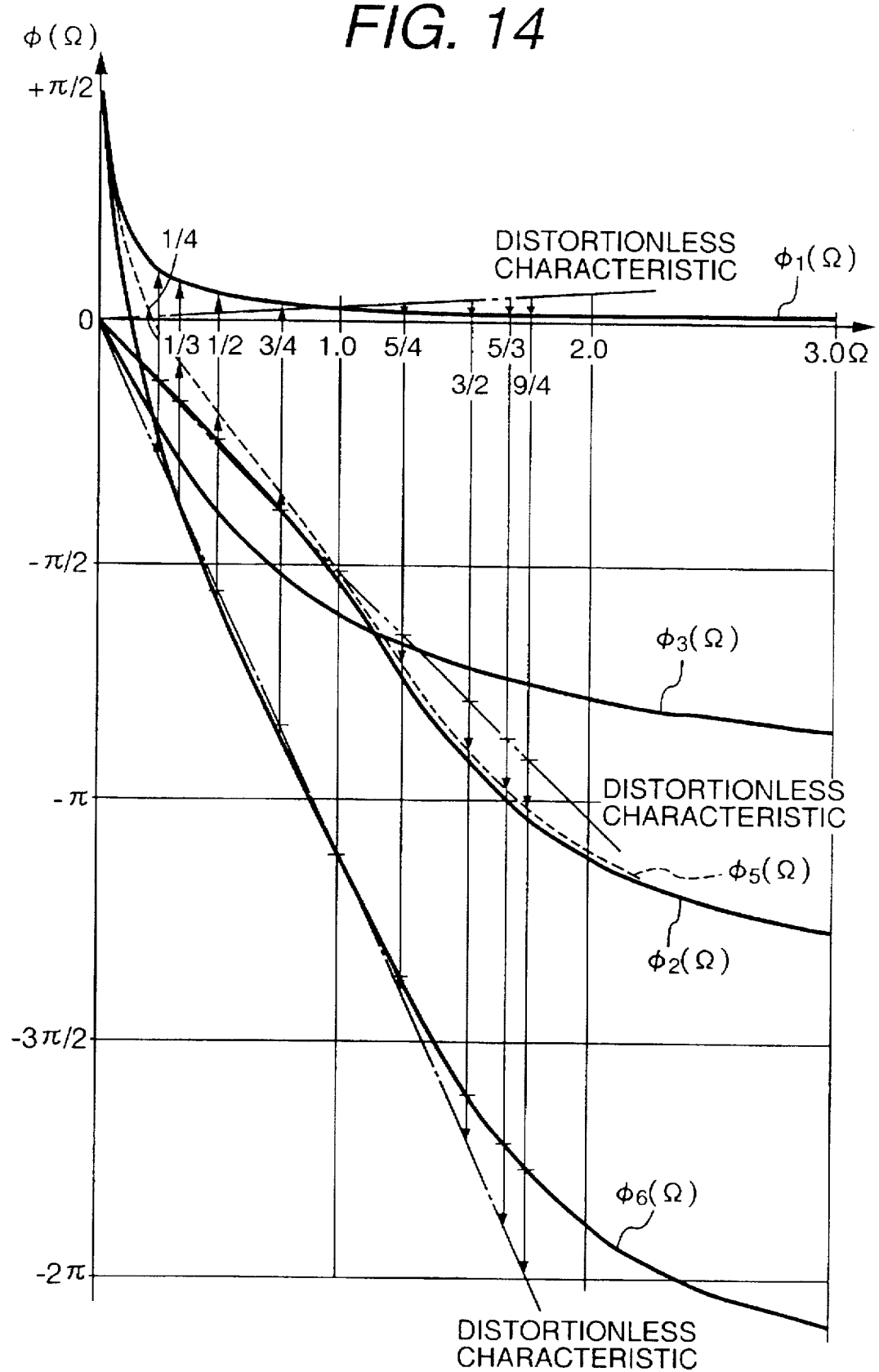
FIG. 14 is a graph showing the phase characteristics obtained when a filter circuit 2 shown in FIG. 10 comprises a 3rd-order Chebyshev type low-pass filter.

FIG. 14 shows the phase characteristics obtained when the filter circuit 2 shown in FIG. 10 comprises a 3rd-order Chebyshev type low-pass filter. $\phi_1(\Omega)$ represents the phase characteristics of the AC coupling circuit, which are the same as $\phi_1(\Omega)$ shown in FIG. 13. $\phi_2(\Omega)$ represents an example of the phase characteristics of the 3rd-order Chebyshev type low-pass filter, and $\phi_5(\Omega)$ represents the synthesized phase characteristics of these characteristics. The synthesized phase characteristics $\phi_5(\Omega)$ are given by:

$$\phi_5(\Omega)=\phi_1(\Omega)+\phi_2(\Omega)$$

That is, the synthesized characteristics are as indicated by a broken curve in FIG. 14. When the phase characteristics $\phi_3(\Omega)$ of one of the phase circuits shown in FIGS. 12A to 12C (but having a constant different from FIG. 13) are synthesized with the synthesized phase characteristics $\phi_5(\Omega)$, the synthesized phase characteristics $\phi_6(\Omega)$ are given by:

$$\phi_6(\Omega) = \phi_5(\Omega)+\phi_3(\Omega)$$
$$= \phi_1(\Omega)+\phi_2(\Omega)+\phi_3(\Omega)$$

As shown in FIG. 14, the synthesized phase characteristics $\phi_6(\Omega)$ are roughly defined by a straight line from $\Omega=\frac{1}{4}$ to $\Omega=1.0$. That is, distortionless characteristics can be realized in a predetermined frequency range.

Although the reproduction signal of a repetitive pattern of bits having a 4T bit length and a 4T interval has no frequency components less than $\Omega=\frac{1}{4}$, when different bit lengths and bit intervals appear at random, low-frequency components are generated. However, since the ratio of such components is very much smaller than $\Omega=\frac{1}{4}$, the phase distortion at $\Omega=\frac{1}{4}$ or less does not pose any serious problem. Also, since the ratio of components of $\Omega=1.0$ or more is also small, the phase distortion at $\Omega=1.0$ or more similarly has almost no influence. Therefore, in such a case, since the phase characteristics $\phi_6(\Omega)$ exhibit distortionless characteristics within the range from $\Omega=\frac{1}{4}$ to 1.0, the phase distortion caused by the AC coupling circuit can be perfectly corrected.

Figure 15:
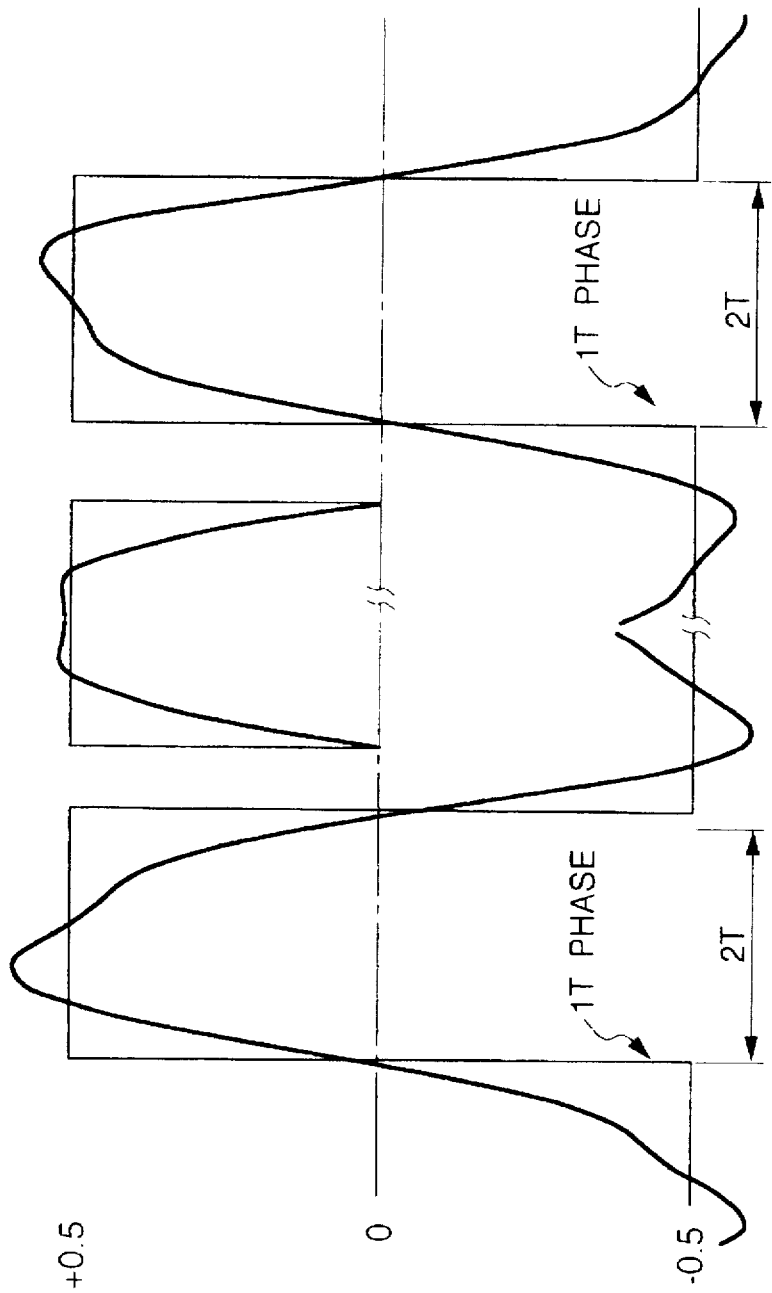
FIG. 15 is a graph for comparing reproduction signals of a repetitive pattern of bits having a bit length 2T and a bit interval 2T in correspondence with cases with and without phase compensation.
Figure 16:
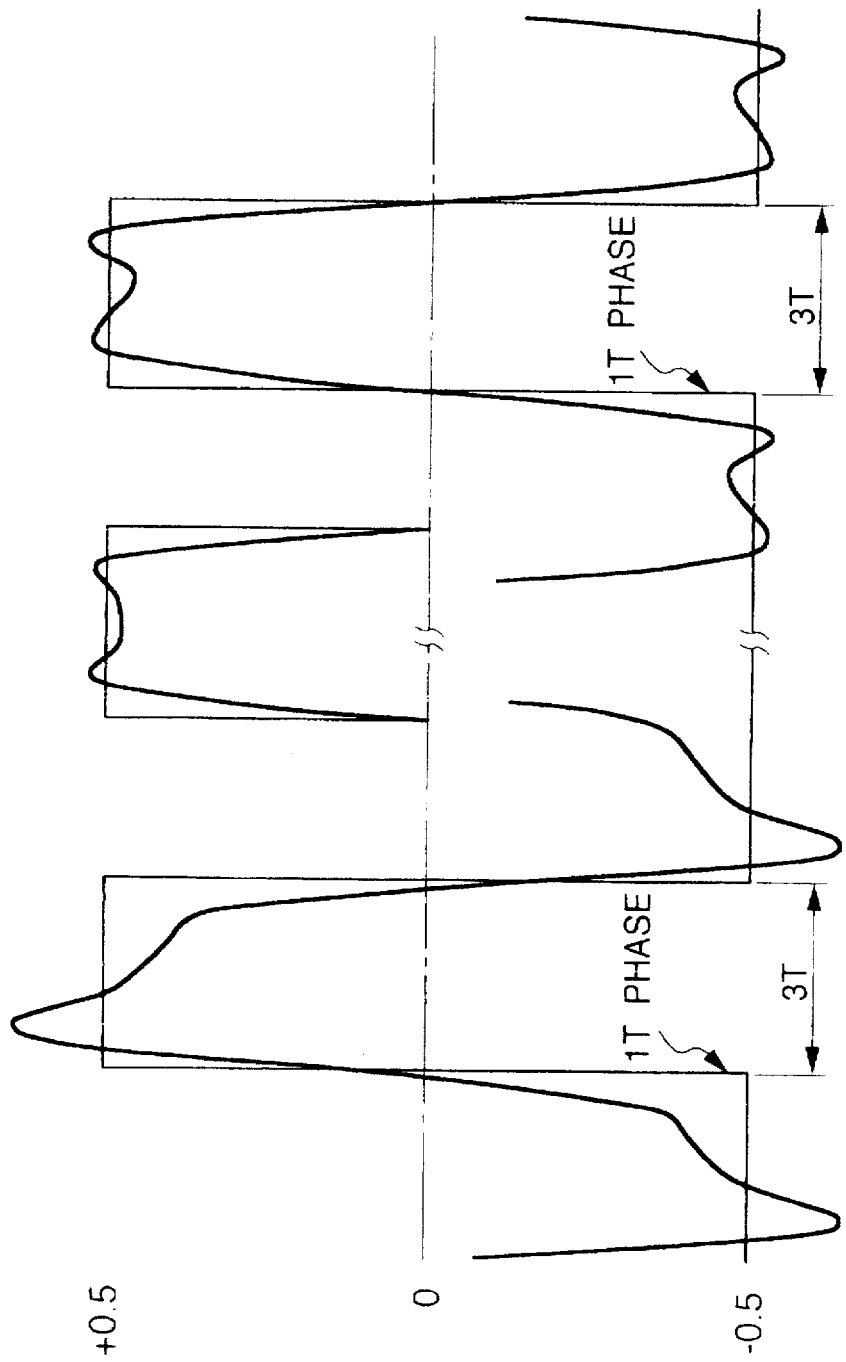
FIG. 16 is a graph for comparing reproduction signals of a repetitive pattern of bits having a bit length 3T and a bit interval 3T in correspondence with cases with and without phase compensation.
Figure 17:
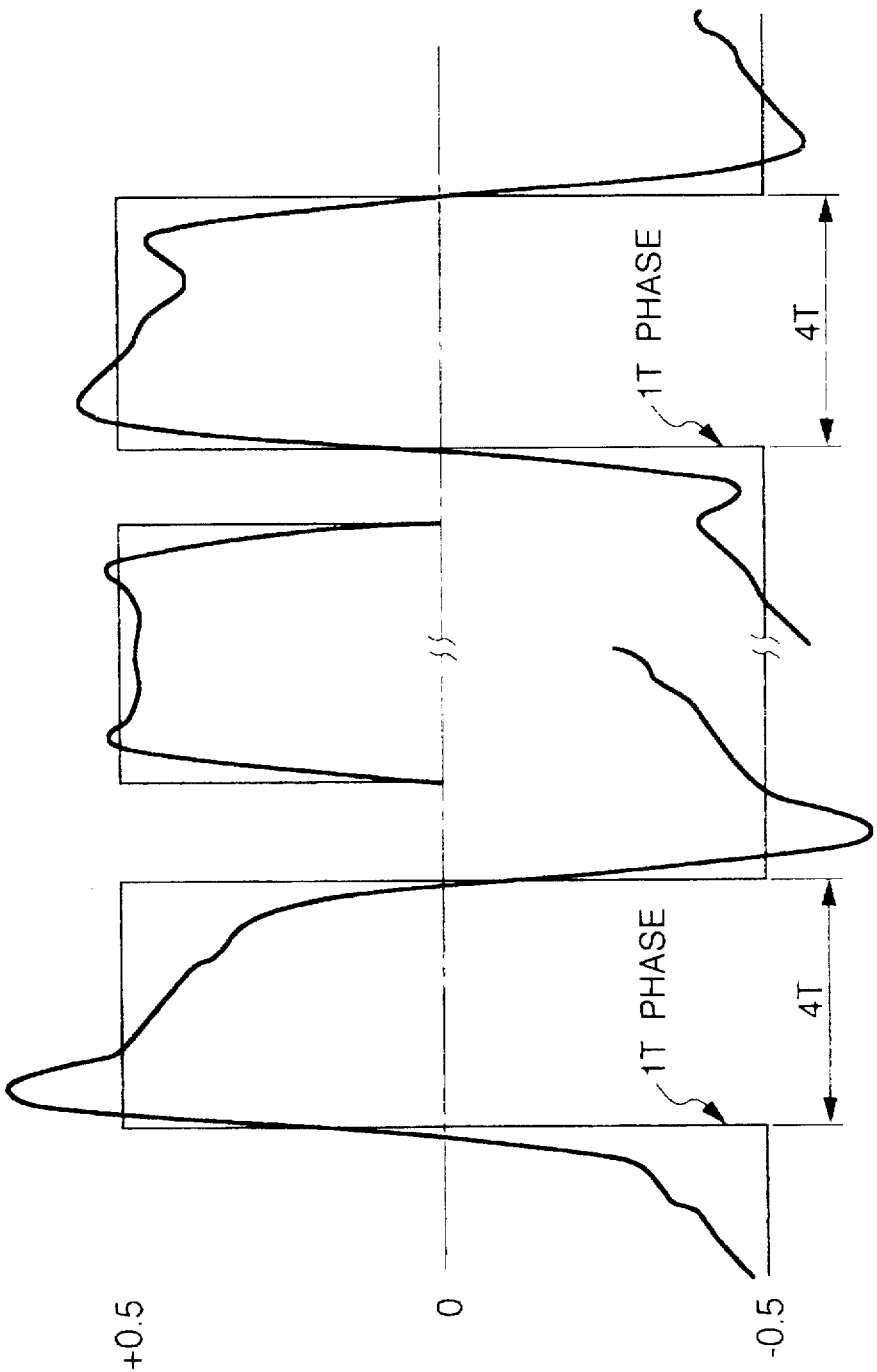
FIG. 17 is a graph for comparing reproduction signals of a repetitive pattern of bits having a bit length 4T and a bit interval 4T in correspondence with cases with and without phase compensation.

FIGS. 15 to 17 show examples of the reproduction signal waveforms in the case of the phase characteristics shown in FIG. 14. Parts (A) to (C) in FIG. 15 show the reproduction signal waveforms of a repetitive pattern of bits having a 2T bit length and a 2T bit interval, parts (A) to (C) in FIG. 16 show the reproduction signal waveforms of a repetitive pattern of bits having a 3T bit length and a 3T bit interval, and parts (A) to (C) in FIG. 17 show the reproduction signal waveforms of a repetitive pattern of bits having a 4T bit length and a 4T bit interval. Each part (A) of FIGS. 15, 16, and 17 shows the reproduction signal obtained with distortionless characteristics, each part (B) of FIGS. 15, 16, and 17 shows the reproduction characteristics obtained without any phase compensation (in the case of the phase characteristics $\phi_1(\Omega)$), and each part (C) of FIGS. 15, 16, and 17 shows the reproduction signal obtained with phase compensation (in the case of the phase characteristics $\phi_6(\Omega)$. The reproduction signal of the repetitive pattern of bits having the 2T bit length and the 2T bit interval shown in FIG. 15 will be described below. Since the phase characteristics $\phi_6(\Omega)$ shown in FIG. 14 have a phase delayed from that of the straight line in FIG. 14 at $\Omega=\frac{1}{2}$, the phase distortion is over-corrected in the case with phase compensation shown in (C) in FIG. 15. However, as compared to the case without phase compensation shown (B) in FIG. 15, both the signal waveform and jitter can be greatly improved.

In the reproduction signal of the repetitive pattern of bits having the 3T bit length and 3T bit intervals shown parts (A) to (C) in FIG. 16, as can be seen from a comparison between parts (A) to (C) in FIG. 16, the phase distortion is almost completely corrected. Finally, in the reproduction signal of the repetitive pattern of bits having the 4T bit length and 4T bit intervals shown in parts (A) to (C) in FIG. 17, as can be seen from $\phi_6(\Omega)$ shown in FIG. 14 whose phase is advanced from that of the straight line at $\Omega=\frac{1}{4}$, the phase distortion is under-corrected in the case with phase compensation shown (C) in FIG. 17. However, in this case as well, as compared to the case without phase compensation shown (B) in FIG. 17, both the reproduction signal waveform and jitter can be greatly improved.

The two AC coupling circuits will be explained below. As described above with reference to FIG. 5, the two AC coupling circuits need not always be required, but are convenient. How to combine the characteristics of the two AC coupling circuits when a high AC coupling frequency is set to cope with information reproduction signal variations will be explained. The transfer function, H(s), of the two AC coupling circuits as a quadratic high-pass filter, can be expressed as follows:

$$H(s) = s^2/(s^2+2\zeta\omega_n s+\omega_n^2)$$
$$= s^2/(s+\omega_1)(s+\omega_2)$$

where s is the Laplace operator, and $\zeta$ is an elastic coefficient. $\omega_n$ is given by:

$$\omega_n = \sqrt{(\omega_1\omega_2)}$$
$$= 2\pi\sqrt{(f_{n1}f_{n2})}$$

where $f_{n1}$ and $f_{n2}$ are the AC coupling frequencies of the respective circuits, and are given by:

$$f_{n1}=\frac{1}{2\pi}C_2R_4$$

$$f_{n2}=\frac{1}{2\pi}C_1R_1$$

If $f_{n2}=f_{n1}/m$, we have:

$$H(s)=s^2/(s+\omega_1)(s+\omega_1/m)$$

$$\zeta=(m+1)/2\sqrt{m}$$

Also, the phase characteristics $\phi_1(f)$ are given by:

$$\phi_1(f)=\tan^{-1}(f_{n1}/f)+\tan^{-1}(f_{n1}/mf)$$

Therefore, when the ratio m between the AC coupling frequencies of the two circuits is large; $\omega_1/m\approx0$, i.e., the result roughly equals that of linear characteristics. Also, as for the phase characteristics, if $f_{n1}<f_n$, $f_{n1}<mf\approx0$, i.e., the result roughly equals that of linear characteristics. Furthermore, in order to attain a step response of 5% or less, $\zeta>2$, and m>14. Therefore, a larger ratio m is preferable, and when the ratio of the AC coupling frequencies of the two circuits is set to be 15:1 or more, the phase characteristics are determined by the higher AC coupling frequency, as shown in FIGS. 13 and 14.

As can be seen from the above description, upon setting of the constants of the two AC coupling circuits, since the first AC coupling circuit constituted by the capacitor C1 and the resistor R1 shown in FIG. 10 is a circuit for correcting the temperature drift of a photosensor 114, as has been described above with reference to FIG. 5, its AC coupling frequency can be very low considering the time constant of the temperature drift. Therefore, the AC coupling frequency of the second AC coupling circuit constituted by the capacitor C2 and the resistor R4 is set to be high, and that of the first AC coupling circuit constituted by the capacitor C1 and the resistor R1 can be set to be 1/20 that of the second circuit or less.

Figure 18:
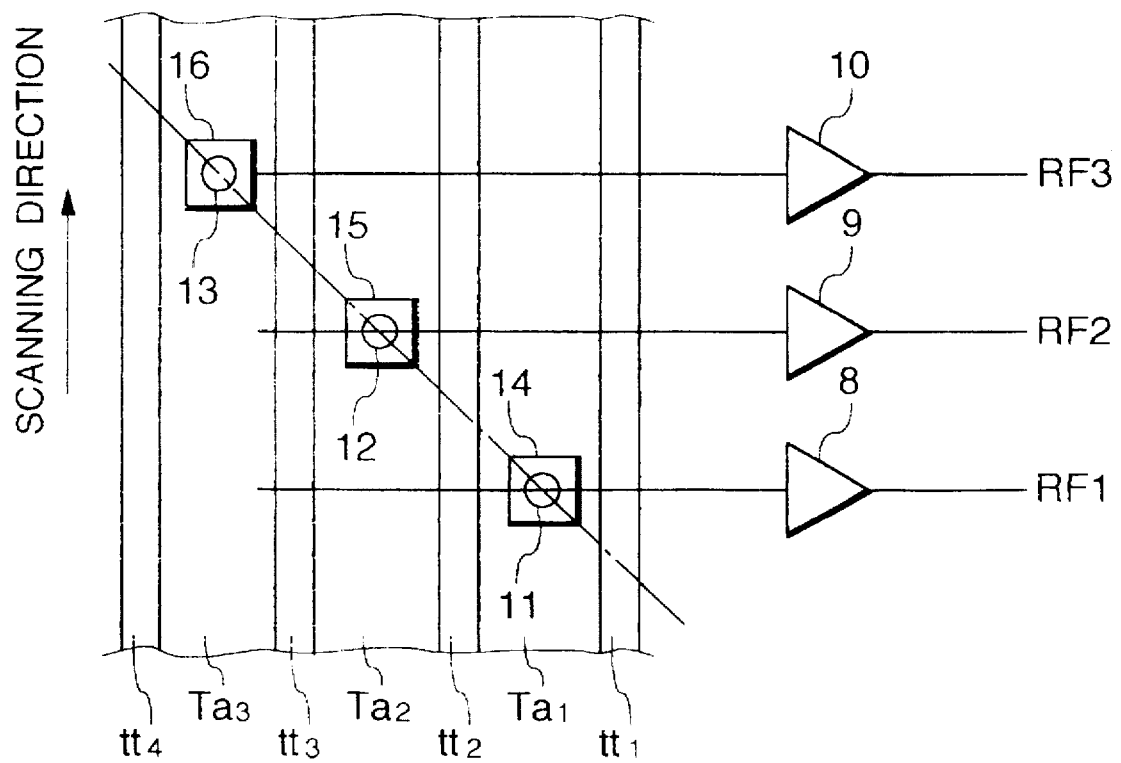
FIG. 18 is a view showing the layout of light spots on the optical card surface and the layout of sensor elements for detecting reflected light beams of these light spots, when a plurality of tracks are simultaneously subjected to reproduction.

Another embodiment of the present invention will be described below. In recent years, in order to improve the throughput of information reproduction, a method of simultaneously reproducing information on a plurality of tracks by a single scan has become increasingly popular. FIG. 18 shows the layout of light spots on an optical card C in this case, and the corresponding layout of photosensors. In FIG. 18, the light spots and the photosensors required for AF and AT are not shown. In this case, assume that the apparatus shown in FIG. 2 simultaneously reproduces information on a plurality of tracks.

Figure 1:
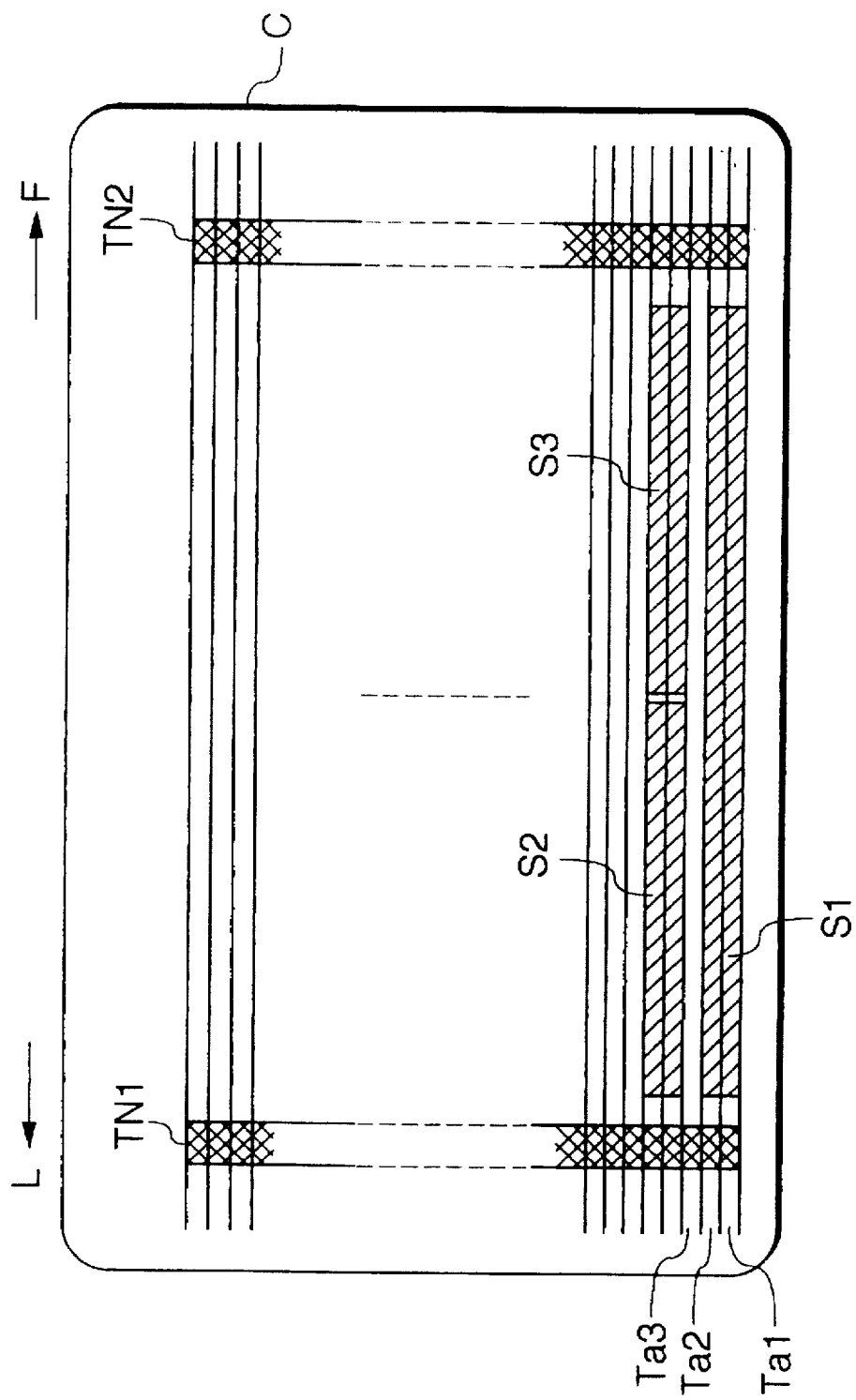
FIG. 1 is a view showing the recording format of an optical card.
Figure 2:
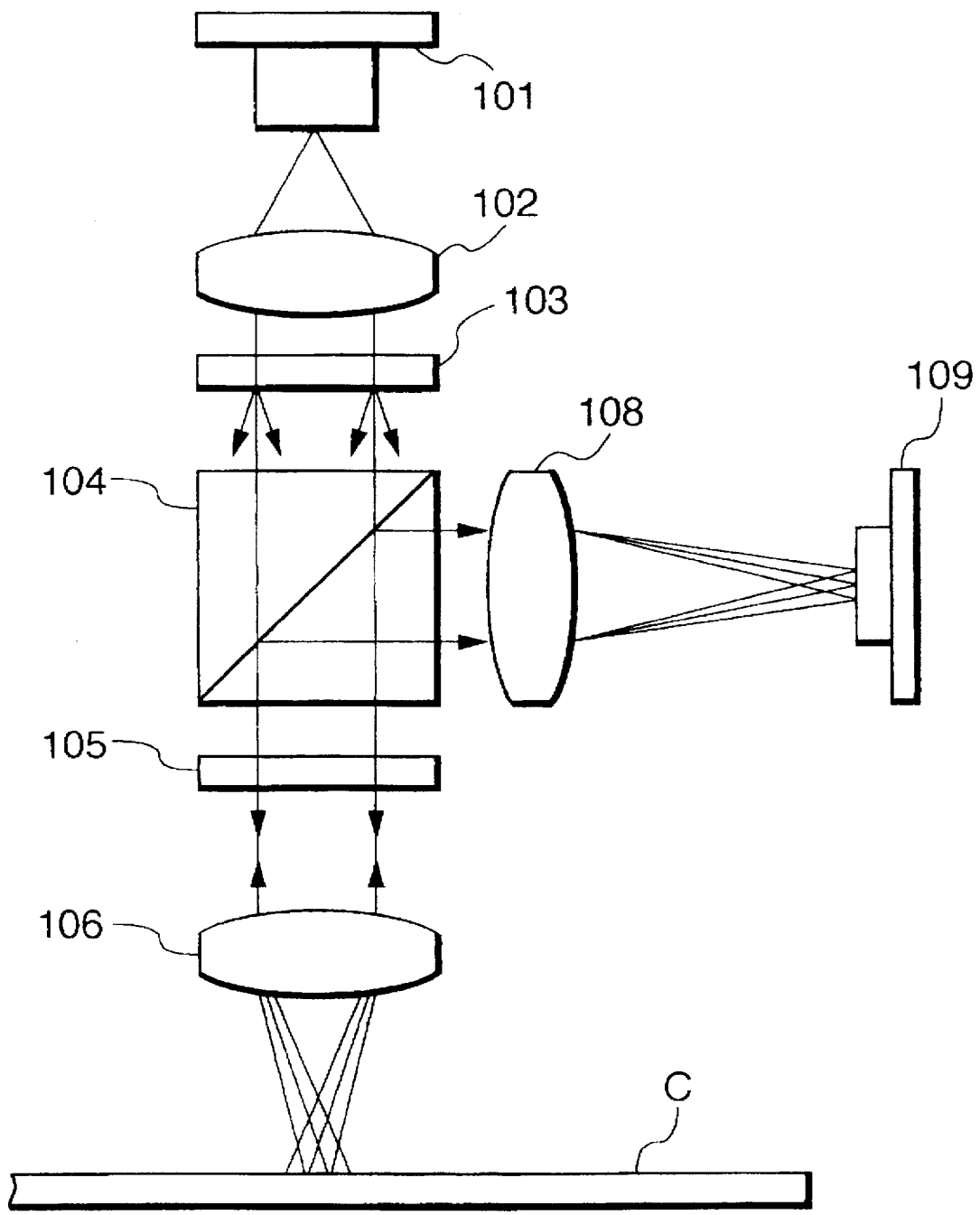
FIG. 2 is a schematic view showing the arrangement of an optical system of an optical information recording/reproduction apparatus.
Figure 3:
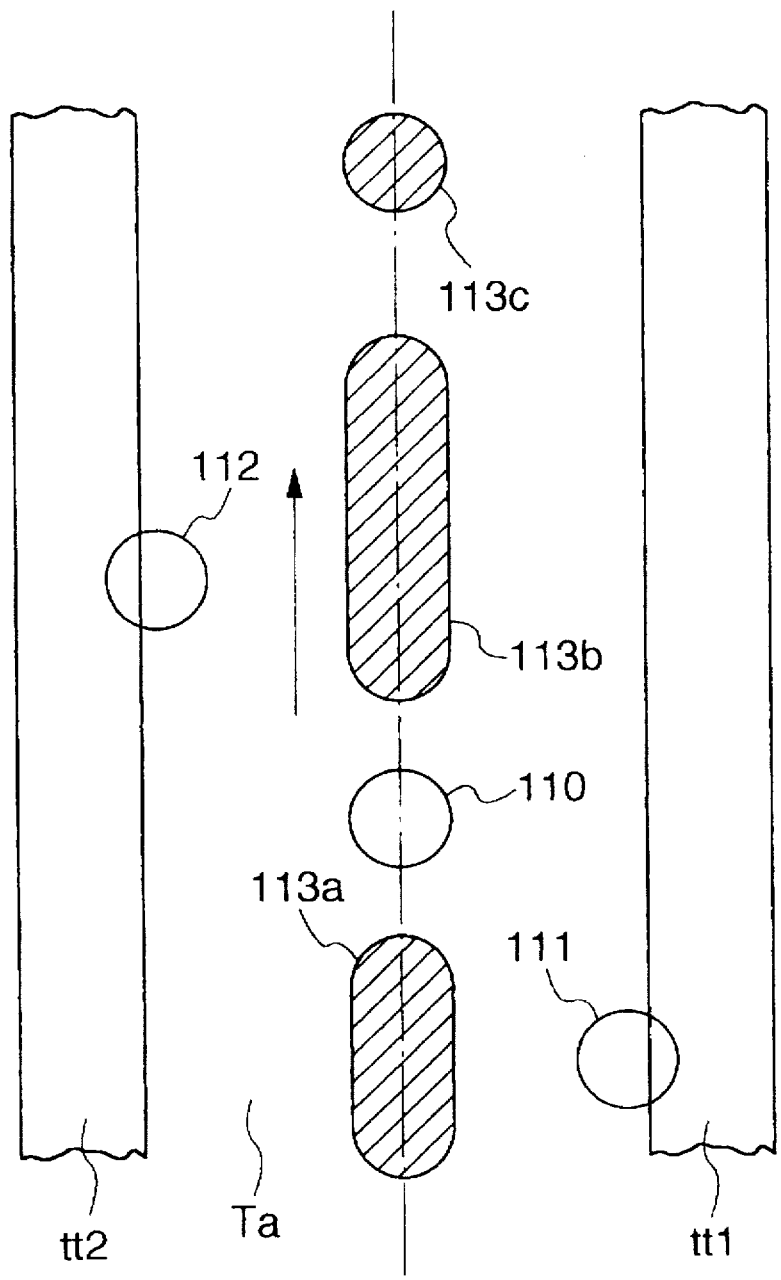
FIG. 3 is a view showing the scanning state of light spots on an information track of an optical card.
Figure 4:
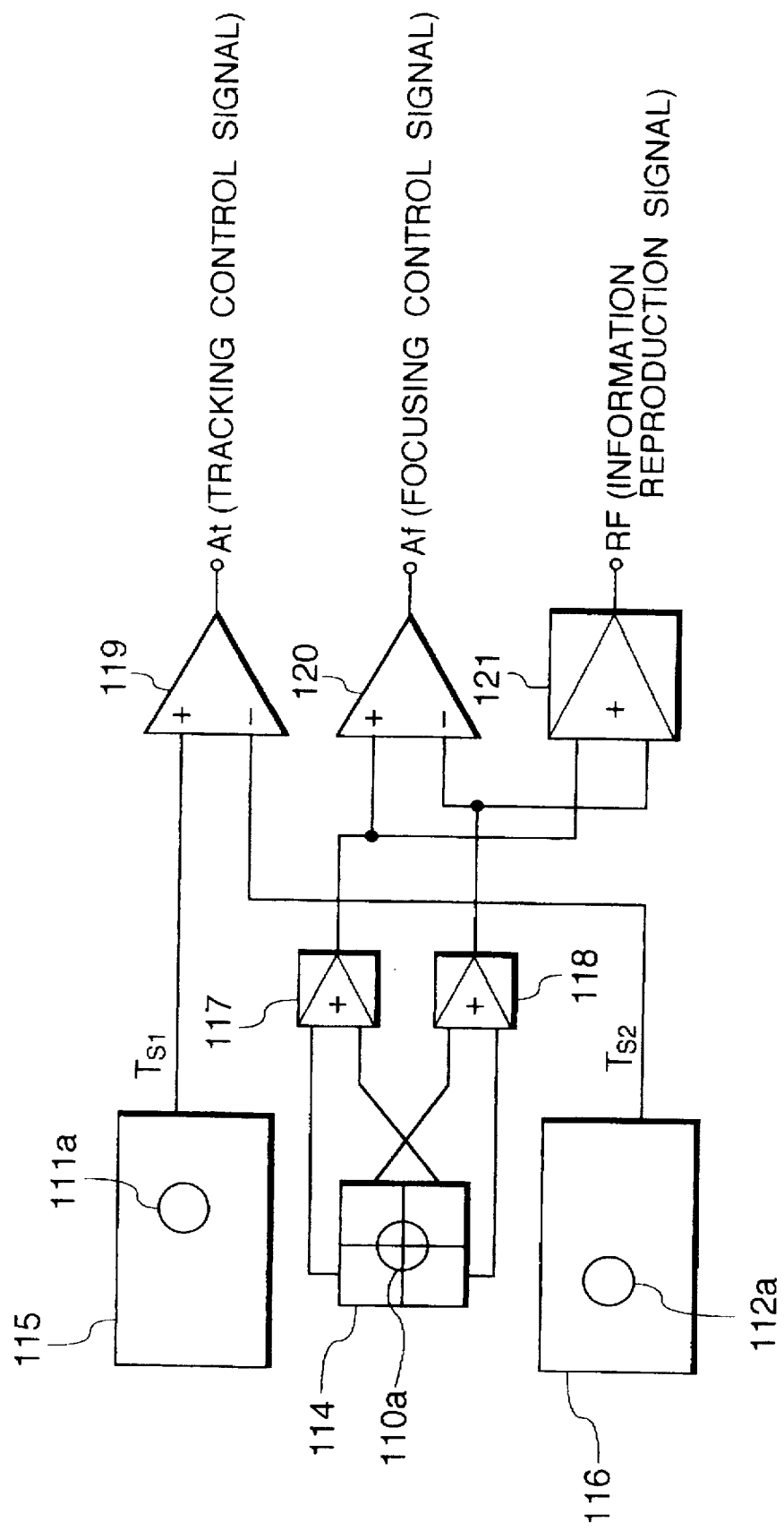
FIG. 4 is a circuit diagram showing a signal processing circuit for generating an information reproduction signal and the like by processing signals detected by a photodetector of the apparatus shown in FIG. 2.

A light beam emitted by the semiconductor laser 101 shown in FIG. 2 is split into three light beams by the diffraction grating 103. The three light beams converge via the objective lens 106, and are irradiated onto three information tracks. In this manner, light spots 11, 12, and 13 are divisionally irradiated onto information tracks $T_{a1}$, $T_{a2}$, and $T_{a3}$ shown in FIG. 18 to attain simultaneous reproduction. The photodetector 109 shown in FIG. 2 comprises sensor elements 14, 15, and 16 shown in FIG. 18. These sensor elements are arranged, as shown in FIG. 18, in correspondence with the light spots 11, 12, and 13. When the light spots scan on the optical card C in the direction of an arrow in FIG. 18, the sensor elements 14 to 16 detect the reflected light beams of these light spots, and information reproduction signals for three tracks are simultaneously obtained in correspondence with bits recorded on the respective tracks. The output signals from the sensor elements 14, 15, and 16 are output to information reproduction circuits each equivalent to that shown in FIG. 10 via pre-amplifiers 8, 9, and 10 (normally, current-voltage conversion amplifiers), and are subjected to signal processing such as binary conversion in the respective information reproduction circuits, as described above, thereby generating reproduction data for three tracks.

That is, three systems of information reproduction circuits shown in FIG. 10 are required. In an example shown in FIG. 18, three tracks are simultaneously subjected to reproduction. Although a large number of tracks may be simultaneously subjected to reproduction, the circuit scale increases in this case. In view of this problem, in this embodiment, the circuit scale is reduced. That is, when a plurality of tracks are simultaneously subjected to reproduction in a single scan, at least one of a plurality of information reproduction circuits is designed to have the circuit characteristics described above with reference to FIGS. 10 to 14, and other circuits are set to have lower AC coupling frequencies than that of the at least one circuit so as to omit the phase compensation circuit 3, thus attaining a cost reduction and a hardware size reduction of the apparatus. Therefore, in this embodiment, when a plurality of information tracks are simultaneously subjected to reproduction, the phase compensation circuit 3 shown in FIG. 10 is arranged in at least one of a plurality of information reproduction circuits. With this arrangement, when at least one system has a sufficiently large reproduction margin, even when a reproduction error has occurred in another system, reproduction can be re-done in the system with the large reproduction margin. Therefore, although the processing time is prolonged accordingly, high reproduction reliability can be assured in the same manner as in a case wherein all the systems have a large reproduction margin.

This embodiment is not limited to one system upon simultaneous reproduction of three tracks. For example, when five tracks are simultaneously subjected to reproduction, three systems may have the circuit characteristics described above with reference to FIGS. 10 to 14. That is, various combinations are available. Furthermore, when a reproduction error has occurred, information may be reproduced again by seeking a reproduction head so as to reproduce information using the light spot corresponding to the system that has caused the error. However, in place of seeking the reproduction head, a switch for switching the plurality of systems may be arranged to switch only the circuits while the light spot positions remain the same, thus omitting the seek time.

In the above embodiments, optical recording/reproduction on/from the optical card as a recording medium has been exemplified. However, the present invention is not limited to the optical card but may be applied to a magnetic card, an optical disk, a magnetic disk, and the like independently of the types of recording media. The phase correction of the AC coupling circuit and that of the filter circuit may be attained by two different phase compensation circuits, but are preferably performed by a single phase compensation circuit at the same time since the cost increases otherwise. In this case, the phase correction can be sufficiently attained by a single phase compensation circuit, as has been described above with reference to FIGS. 14 to 17, and performance can be improved without increasing cost.

As described above, according to the present invention, when the phase compensation means for correcting the phase characteristics of the entire circuit including the AC coupling circuit is arranged, jitter caused by the AC coupling circuit itself can be reduced, and hence, a high AC coupling frequency can be set. Therefore, the amount of jitter caused by information reproduction signal variations due to various causes can be reduced, and stable information reproduction with high reliability can be realized.

When a plurality of information tracks are to be simultaneously subjected to reproduction by a single scan, the phase compensation means is arranged in at least one of a plurality of reproduction signal processing circuits corresponding to the plurality of tracks. With this arrangement, when a reproduction error has occurred in another reproduction signal processing circuit, information can be reproduced by the reproduction signal processing circuit with the phase compensation means, thus assuring high reproduction reliability without increasing the circuit scale of the apparatus.

What is claimed is:

1. An information reproduction apparatus including a reproduction signal processing system for reproducing digital information recorded on an information track of a recording medium by a bit edge recording method and for reproducing the digital information by converting a reproduction signal read out from the recording medium into a binary signal after the reproduction signal is subjected to AC-coupling, said apparatus comprising:

a phase compensation circuit arranged in said reproduction signal processing system to compensate for a phase distortion of the reproduction signal under the influence of the AC-coupling.

2. An apparatus according to claim 1, wherein phase characteristics of said reproduction signal processing system including said compensation circuit are made such that a phase difference at a frequency corresponding to a fraction of a longest mark pitch from a straight line connecting an origin at zero frequency and zero phase, and a frequency corresponding to a fraction of a shortest mark pitch is smaller than a phase difference at a frequency corresponding to a fraction of a mark pitch at the middle of the shortest and longest mark pitches.

3. An apparatus according to claim 1, wherein said phase compensation circuit is provided at an upstream side with respect to the AC-coupling.

4. An apparatus according to claim 1, wherein said phase compensation circuit comprises a linear phase compensation circuit.

5. An apparatus according to claim 1, further comprising two kinds of AC-couplings, the ratio of which is at least 15:1.

6. An apparatus according to claim 5, wherein said phase compensation circuit is provided at an upstream side with respect to one of the two AC couplings, effected at a downstream side relative to the other.

7. An apparatus according to claim 1, wherein the recording medium includes a plurality of information tracks, and said apparatus further comprises a plurality of reproduction signal processing systems for reproducing digital information from the plurality of information tracks at the same time.

8. An apparatus according to claim 7, wherein at least one of said plurality of reproduction signal processing systems includes a phase compensation circuit for compensating for a phase distortion of the reproduction signal under the influence of the AC coupling circuit.

9. An apparatus according to claim 8, wherein a time constant of the AC coupling circuit in the reproduction processing system, in which said phase compensation circuit is arranged, of said plurality of reproduction signal processing systems is minimized.

10. An apparatus according to claim 8, wherein when a reproduction error has occurred on at least one information track when the plurality of information tracks are simultaneously subjected to reproduction, the reproduction signal processing system in which said phase compensation circuit is arranged reproduces again the information track that has caused the error.

11. An apparatus according to claim 1, wherein the recording medium is a card-shaped optical information recording medium.

* * * * *

UNITED STATES PATENT AND TRADEMARK OFFICE
CERTIFICATE OF CORRECTION

PATENT NO. : 5,726,963

DATED : March 10, 1998

INVENTOR : SHINICHI OHTA

It is certified that error appears in the above-identified patent and that said Letters Patent is hereby corrected as shown below:

COLUMN 1:

Line 27, "diversily" should read --diversify--.

Signed and Sealed this

Eighteenth Day of May, 1999

Attest:

Q. TODD DICKINSON

*Attesting Officer*   *Acting Commissioner of Patents and Trademarks*